US012741753B2

(12) United States Patent
Motoyama et al.

(10) Patent No.: US 12,741,753 B2
(45) Date of Patent: Sep. 22, 2026

(54) INFORMATION PROCESSING METHOD, INFORMATION PROCESSING DEVICE, INFORMATION PROCESSING PROGRAM, AND INFORMATION PROCESSING SYSTEM

(71) Applicant: Sony Group Corporation, Tokyo (JP)

(72) Inventors: Takuto Motoyama, Tokyo (JP); Masaki Handa, Tokyo (JP); Shinichiro Abe, Tokyo (JP); Masahiko Toyoshi, Tokyo (JP); Kohei Urushido, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 402 days.

(21) Appl. No.: 18/551,605

(22) PCT Filed: Feb. 2, 2022

(86) PCT No.: PCT/JP2022/004046
§ 371 (c)(1),
(2) Date: Feb. 23, 2024

(87) PCT Pub. No.: WO2022/209261
PCT Pub. Date: Oct. 6, 2022

(65) Prior Publication Data

US 2024/0393805 A1 Nov. 28, 2024

(30) Foreign Application Priority Data

Mar. 30, 2021 (JP) ................................ 2021-058561

(51) Int. Cl.
*B64D 47/08* (2006.01)
*B64C 39/02* (2023.01)
(Continued)

(52) U.S. Cl.
CPC .............. *B64D 47/08* (2013.01); *B64C 39/02* (2013.01); *G05D 1/46* (2024.01); *G05D 1/686* (2024.01);
(Continued)

(58) Field of Classification Search
CPC .......... B64D 47/08; B64C 39/02; G06D 1/46; G06V 10/764; G06V 10/74; G06V 20/17; G06T 7/70
(Continued)

(56) References Cited

U.S. PATENT DOCUMENTS 11,762,398 B1 * 9/2023 Taylor .................. G05D 1/0676 701/16
2017/0001732 A1 * 1/2017 Lim ..................... G05D 1/0684
(Continued)

FOREIGN PATENT DOCUMENTS

JP 2011-128020 A 6/2011
JP 2012071645 A 4/2012
(Continued)

OTHER PUBLICATIONS

International Search Report and Written Opinion mailed on Apr. 5, 2022, received for PCT Application PCT/JP2022/004046, filed on Feb. 2, 2022, 8 pages including English Translation.

*Primary Examiner* — Yazan A Soofi
(74) *Attorney, Agent, or Firm* — XSENSUS LLP

(57) ABSTRACT

An information processing method executed by one processor or executed by a plurality of processors in cooperation, the method includes: an estimation step of estimating a relative position or a relative attitude of an aerial vehicle with respect to a moving body; an acquisition step of acquiring information related to a distance between the moving body and the aerial vehicle; and a switching step of switching an estimation method for estimating the relative
(Continued)

position or the relative attitude of the aerial vehicle, based on the information related to the distance.

20 Claims, 24 Drawing Sheets

(51) Int. Cl.

| | |
|---|---|
| ***B64U 101/30*** | (2023.01) |
| ***G05D 1/46*** | (2024.01) |
| ***G05D 1/686*** | (2024.01) |
| ***G05D 109/25*** | (2024.01) |
| ***G06T 7/70*** | (2017.01) |
| ***G06V 10/74*** | (2022.01) |
| ***G06V 10/764*** | (2022.01) |
| ***G06V 20/17*** | (2022.01) |

(52) U.S. Cl.
CPC ................ *G06T 7/70* (2017.01); *G06V 10/74* (2022.01); *G06V 10/764* (2022.01); *G06V 20/17* (2022.01); *B64U 2101/30* (2023.01); *G05D 2109/254* (2024.01); *G06T 2207/10032* (2013.01)

(58) Field of Classification Search
USPC .............................................................. 701/4
See application file for complete search history.

(56) References Cited

U.S. PATENT DOCUMENTS

| | | | | |
|---|---|---|---|---|
| 2019/0265696 | A1 | 8/2019 | Song | |
| 2021/0109546 | A1* | 4/2021 | Christiana ............ | G05D 1/0684 |
| 2024/0320846 | A1* | 9/2024 | Takahashi ................ | H04N 7/18 |

FOREIGN PATENT DOCUMENTS

| | | | |
|---|---|---|---|
| JP | 2020-067881 | A | 4/2020 |
| JP | 2020138681 | A | 9/2020 |
| WO | 2019/030820 | A1 | 2/2019 |
| WO | 2020/153372 | A1 | 7/2020 |

* cited by examiner

REGION CLASSIFICATION IMAGE
SHIP
CAPTURED IMAGE
FEATURE POINT
30
35
35
35
40
30
30
30
REGION CLASSIFICATION IMAGE
SHIP
CAPTURED IMAGE
BOUNDING BOX

30
LATERAL MOVEMENT
30
SECOND ESTIMATION METHOD
FIRST ESTIMATION METHOD
TH
30
HP
30
30
30
UPWARD MOVEMENT
40

RATIO OF MOTHER SHIP REGION IS HIGH

RATIO OF MOTHER SHIP REGION IS LOW

LARGE NUMBER OF MATCHED FEATURE POINTS

CAPTURED IMAGE

CAPTURED IMAGE

FEATURE POINTS IN PAST FRAME

FEATURE POINTS IN CURRENT FRAME

SMALL NUMBER OF MATCHED FEATURE POINTS

FEATURE POINTS IN PAST FRAME

FEATURE POINTS IN CURRENT FRAME

TH
30
TP
30
30
30
RETAIN
INFORMATION
RELATED TO PATH
30
HP
40

30
S201
30
S203
30
MP
S205
TP
30
MATCH-
ING
CHECK
S207
30
TH
S207
30
S207
S212
HP
30
40

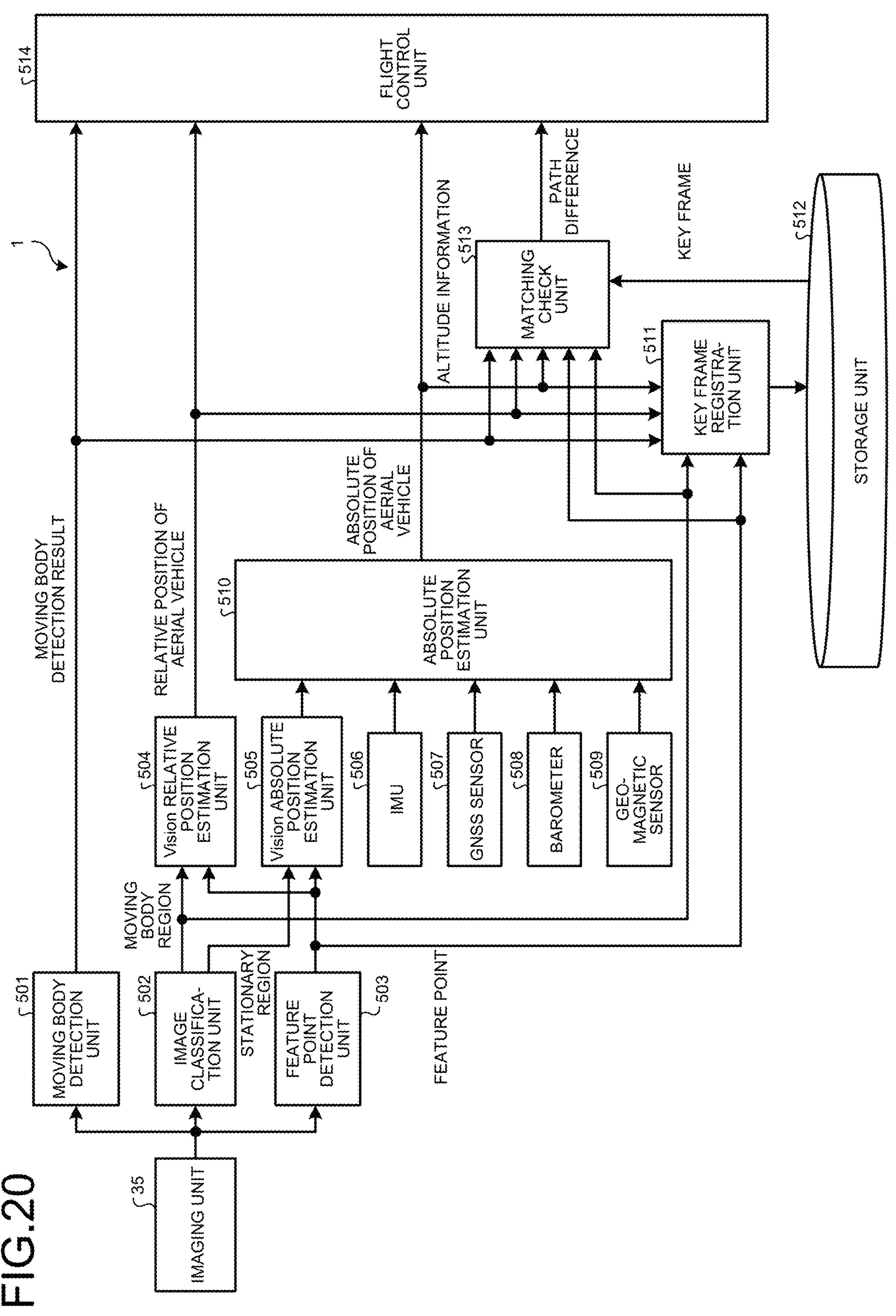
FIG.20
1
IMAGING UNIT
35
MOVING BODY DETECTION UNIT
501
IMAGE CLASSIFICA-TION UNIT
502
FEATURE POINT DETECTION UNIT
503
MOVING BODY REGION
STATIONARY REGION
FEATURE POINT
Vision RELATIVE POSITION ESTIMATION UNIT
504
Vision ABSOLUTE POSITION ESTIMATION UNIT
505
IMU
506
GNSS SENSOR
507
BAROMETER
508
GEO-MAGNETIC SENSOR
509
ABSOLUTE POSITION ESTIMATION UNIT
510
MOVING BODY DETECTION RESULT
RELATIVE POSITION OF AERIAL VEHICLE
ABSOLUTE POSITION OF AERIAL VEHICLE
ALTITUDE INFORMATION
KEY FRAME REGISTRA-TION UNIT
511
STORAGE UNIT
512
MATCHING CHECK UNIT
513
KEY FRAME
PATH DIFFERENCE
FLIGHT CONTROL UNIT
514

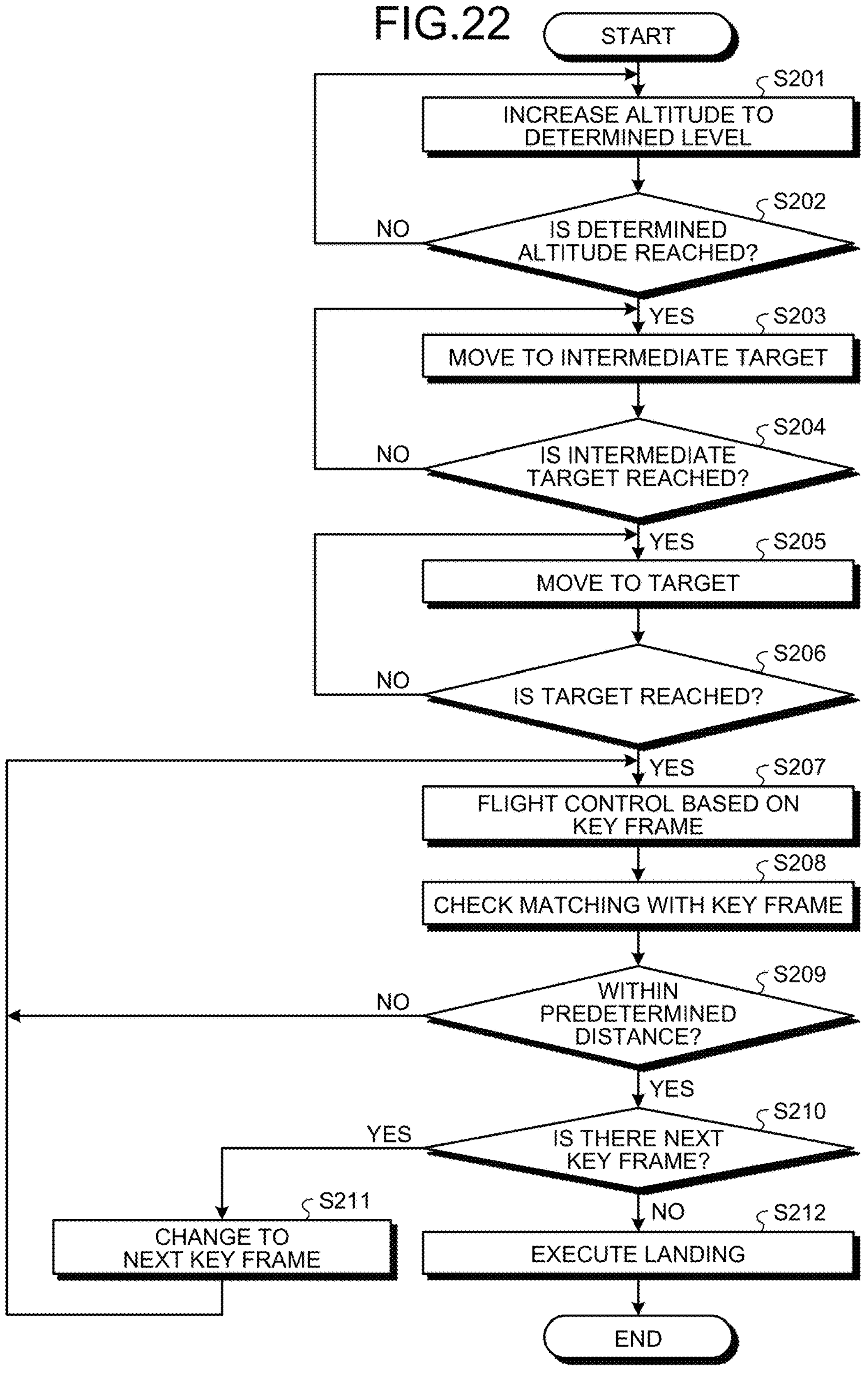
FIG.22
START
S201
INCREASE ALTITUDE TO DETERMINED LEVEL
S202
IS DETERMINED ALTITUDE REACHED?
NO
YES
S203
MOVE TO INTERMEDIATE TARGET
S204
IS INTERMEDIATE TARGET REACHED?
NO
YES
S205
MOVE TO TARGET
S206
IS TARGET REACHED?
NO
YES
S207
FLIGHT CONTROL BASED ON KEY FRAME
S208
CHECK MATCHING WITH KEY FRAME
S209
WITHIN PREDETERMINED DISTANCE?
NO
YES
S210
IS THERE NEXT KEY FRAME?
YES
S211
CHANGE TO NEXT KEY FRAME
NO
S212
EXECUTE LANDING
END

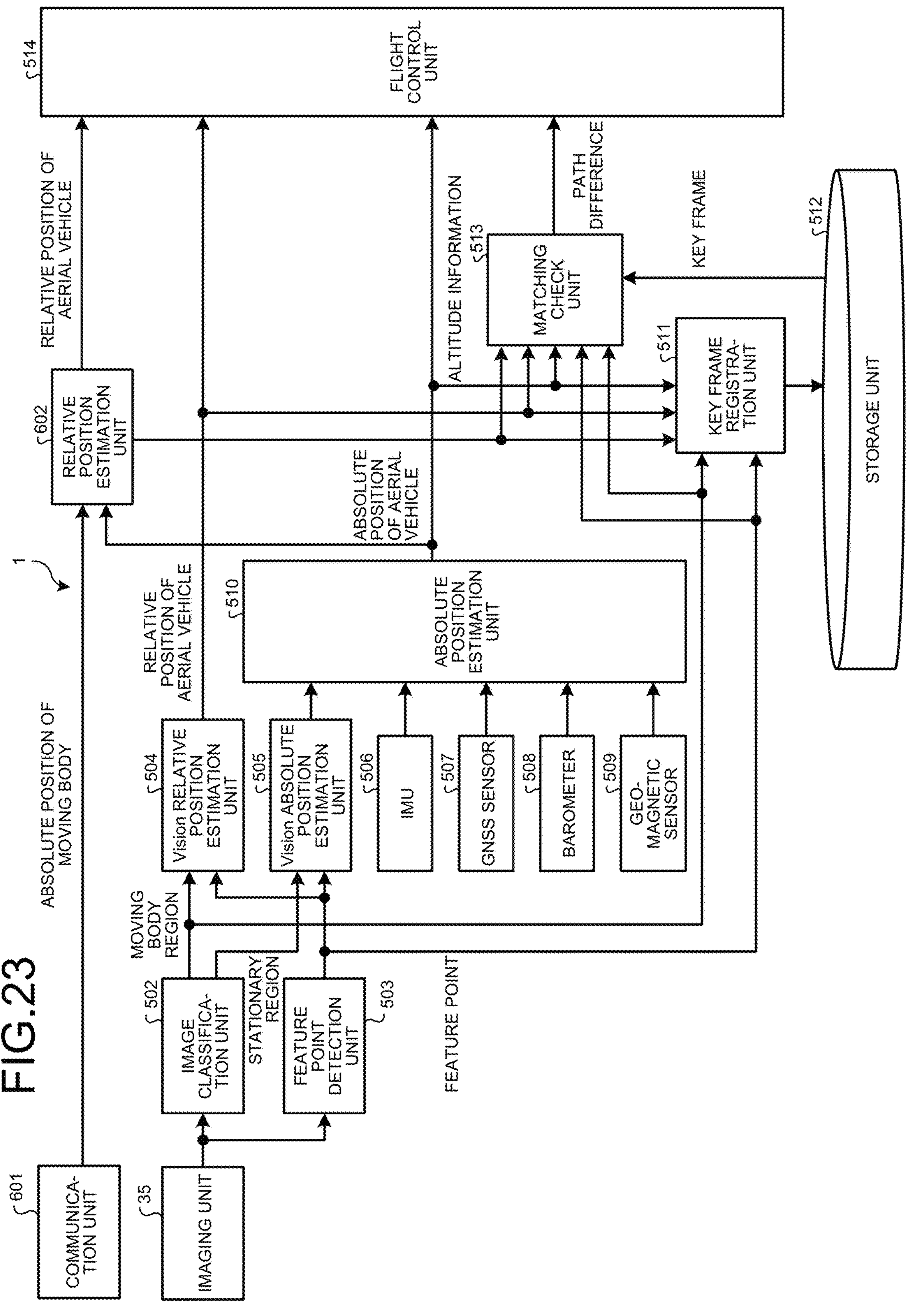
FIG.23
1
601
COMMUNICA-TION UNIT
35
IMAGING UNIT
502
IMAGE CLASSIFICA-TION UNIT
503
FEATURE POINT DETECTION UNIT
MOVING BODY REGION
STATIONARY REGION
FEATURE POINT
ABSOLUTE POSITION OF MOVING BODY
504
Vision RELATIVE POSITION ESTIMATION UNIT
505
Vision ABSOLUTE POSITION ESTIMATION UNIT
506
IMU
507
GNSS SENSOR
508
BAROMETER
509
GEO-MAGNETIC SENSOR
RELATIVE POSITION OF AERIAL VEHICLE
510
ABSOLUTE POSITION ESTIMATION UNIT
ABSOLUTE POSITION OF AERIAL VEHICLE
602
RELATIVE POSITION ESTIMATION UNIT
RELATIVE POSITION OF AERIAL VEHICLE
ALTITUDE INFORMATION
513
MATCHING CHECK UNIT
PATH DIFFERENCE
511
KEY FRAME REGISTRA-TION UNIT
KEY FRAME
512
STORAGE UNIT
514
FLIGHT CONTROL UNIT

INFORMATION PROCESSING METHOD, INFORMATION PROCESSING DEVICE, INFORMATION PROCESSING PROGRAM, AND INFORMATION PROCESSING SYSTEM

CROSS-REFERENCE TO RELATED APPLICATIONS

The present application is based on PCT filing PCT/JP2022/004046, filed Feb. 2, 2022, which claims priority from Japanese Patent Application No. 2021-058561, filed Mar. 30, 2021, the entire contents of each are incorporated herein by reference.

FIELD

The present disclosure relates to an information processing method, an information processing device, an information processing program, and an information processing system.

BACKGROUND

There is a technique of performing automatic flight of an aerial vehicle. For example, there is a known technology of automatically returning a drone that has gone too far away from a home point to a home point on the ground.

CITATION LIST

Patent Literature

Patent Literature 1: WO 2019/030820 A

SUMMARY

Technical Problem

Since the known technique is based on the premise that the home point is in a stationary state, various problems arise in the control of the aerial vehicle depending on the situation in which the home point is placed. For example, in a case where the home point is set as a moving point on a moving body such as a ship, there would be assumable problems such as the aerial vehicle losing sight of the home point to return to, the aerial vehicle colliding with the moving body at the time of take-off or landing.

In view of this, the present disclosure proposes an information processing method, an information processing device, an information processing program, and an information processing system capable of reliably controlling an aerial vehicle.

Note that the above problem or target is merely one of a plurality of problems or targets that can be solved or achieved by a plurality of embodiments disclosed in the present specification.

Solution to Problem

In order to solve the above problem, an information processing method according to one embodiment of the present disclosure executed by one processor or executed by a plurality of processors in cooperation, the method includes: an estimation step of estimating a relative position or a relative attitude of an aerial vehicle with respect to a moving body; an acquisition step of acquiring information related to a distance between the moving body and the aerial vehicle; and a switching step of switching an estimation method for estimating the relative position or the relative attitude of the aerial vehicle, based on the information related to the distance.

BRIEF DESCRIPTION OF DRAWINGS

FIG. 20 is a diagram illustrating a functional configuration of an aerial vehicle control system.

FIG. 22 is a flowchart illustrating return processing according to the present embodiment.

FIG. 23 is a diagram illustrating another example of the functional configuration of an aerial vehicle control system 1.

DESCRIPTION OF EMBODIMENTS

Figure 1A:
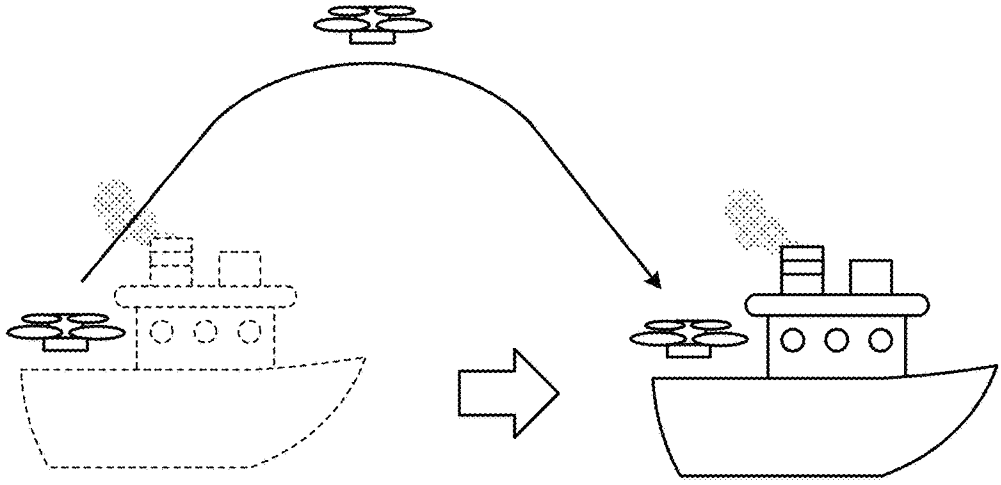
FIG. 1A is a diagram illustrating a state of departure of an aerial vehicle from a ship and subsequent automatic return of the aerial vehicle to the ship.

Embodiments of the present disclosure will be described below in detail with reference to the drawings. Note that, in each of the following embodiments, the same parts are denoted by the same reference symbols, and a repetitive description thereof will be omitted.

Moreover, in the present specification and the drawings, a plurality of components having substantially the same functional configuration will be distinguished by attaching different numbers after the same reference numerals. For example, a plurality of configurations having substantially the same functional configuration are distinguished as necessary, such as terminal devices 201 and 202. However, when it is not particularly necessary to distinguish between the plurality of components having substantially the same functional configuration, only the same reference numeral is given. For example, in a case where it is not necessary to particularly distinguish the terminal devices 201 and 202, they are simply referred to as the terminal device 20.

One or more embodiments (including examples and modifications) described below can each be implemented independently. On the other hand, at least some of the plurality of embodiments described below may be appropriately combined with at least some of other embodiments. The plurality of embodiments may include novel features different from each other. Accordingly, the plurality of embodiments can contribute to achieving or solving different objects or problems, and can exhibit different effects.

The present disclosure will be described in the following order.

1. Overview
2. Configuration of aerial vehicle control system
   2-1. Configuration of server
   2-2. Configuration of terminal device
   2-3. Configuration of aerial vehicle
   2-4. Configuration of moving body
3. Operation of aerial vehicle control system
   3-1. Outline of processing
   3-2. Use of image classification processing
   3-3. Switching estimation method
   3-4. Take-off and landing control
   3-5. Automatic return control
   3-6. Supplementary notes
4. Processing example
   4-1. Functional configuration of aerial vehicle control system
   4-2. Path retention processing
   4-3. Return processing
5. Modification
   5-1. Modification using radio and GNSS sensor
   5-2. Modification of automatic return control
   5-3. Other modifications
6. Conclusion

1. Overview

1-1. Outline of Problem

There is a technique of performing automatic control of an aerial vehicle. For example, there is a known technology of automatically returning a drone that has gone too far away from a home point to a home point on the ground. In the following description, automatic return of an aerial vehicle to a home point or a command for achieving automatic return of an aerial vehicle to a home point is referred to as Return to Home (RTH) in some cases.

Although the conventional technique assumes that a home point is in a stationary state, a home point is not necessarily in a stationary state. The present embodiment assumes a case where a home point is moving. Specifically, an assumable case is a case where the home point is set on a moving body (for example, a ship, truck, or helicopter). When the aerial vehicle of the present embodiment performs departure flight from a moving body, it automatically returns to the same moving body thereafter.

Figure 1B:
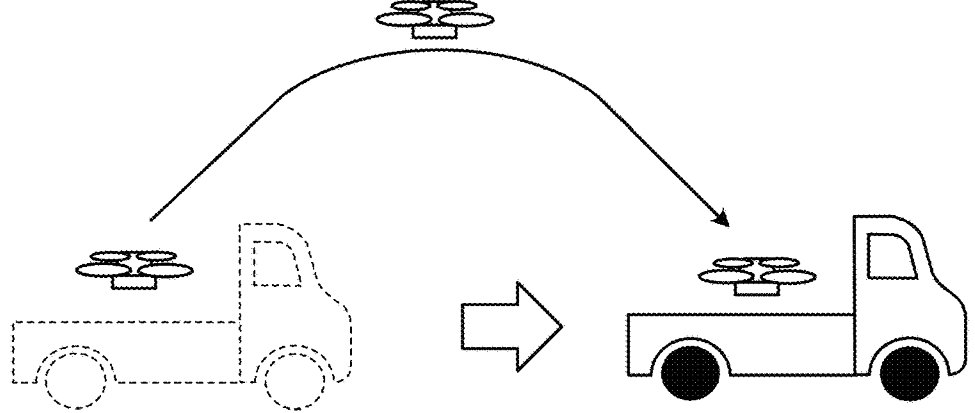
FIG. 1B is a diagram illustrating a state of departure of an aerial vehicle from a truck and subsequent automatic return of the aerial vehicle to the truck.
Figure 1C:
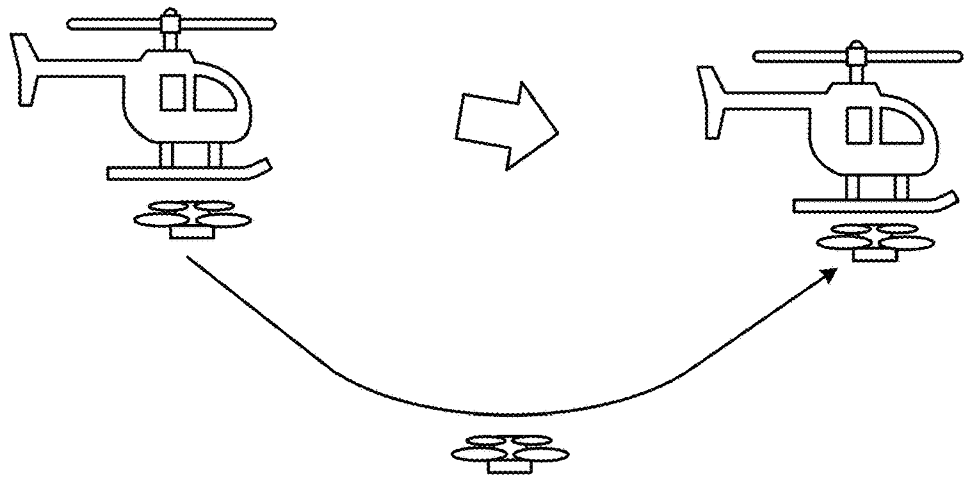
FIG. 1C is a diagram illustrating a state of departure of an aerial vehicle from a helicopter and subsequent automatic return of the aerial vehicle to the helicopter.

FIG. 1A is a diagram illustrating a state of departure of an aerial vehicle from a ship and subsequent automatic return of the aerial vehicle to the ship. In the example of FIG. 1A, the home point is set to a moving body which is a ship. FIG. 1B is a diagram illustrating a state of departure of an aerial vehicle from a truck and subsequent automatic return of the aerial vehicle to the truck. In the example of FIG. 1B, the home point is set to a moving body which is a truck. FIG. 1C is a diagram illustrating a state of departure of an aerial vehicle from a helicopter and subsequent automatic return of the aerial vehicle to the helicopter. In the example of FIG. 1C, the home point is set to a moving body which is a helicopter. In the examples of FIGS. 1A to 1C, the aerial vehicle is a drone, but the aerial vehicle is not limited to a drone. In the following description, a ship to which a home point is set may be referred to as a mother ship.

When a home point is moving, the following problems are assumed.

(1) First problem: attempt of aerial vehicle at RTH to return to a home point at the time of departure (2) Second problem: unstable self-position estimation by an aerial vehicle (3) Third problem: possibility of collision of the aerial vehicle with the moving body at the time of departure and return.

Hereinafter, the problem 1 to 3 will be described in detail.

(1) First Problem

Figure 2:
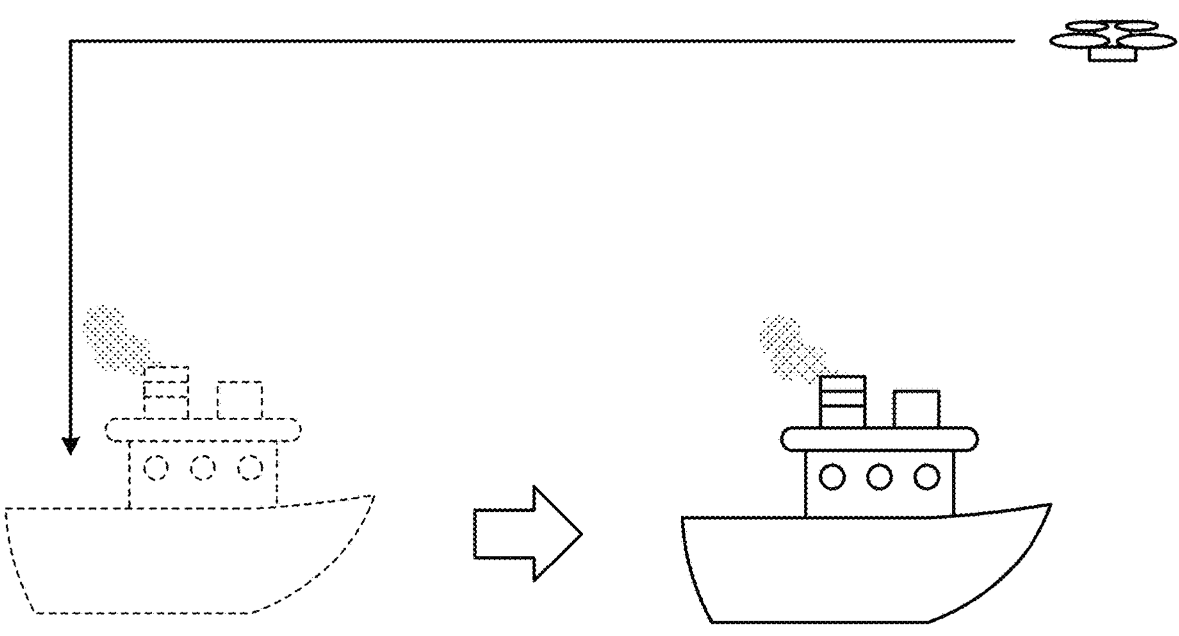
FIG. 2 is a diagram illustrating a first problem of the present embodiment.

FIG. 2 is a diagram illustrating a first problem of the present embodiment. FIG. 2 illustrates a state in which a drone is automatically returning to a mother ship by RTH. In the case of FIG. 2, the mother ship is moving. Therefore, at the time of RTH, the mother ship is not at the departure position of the drone from the mother ship. When the drone grasps its own position by a global positioning system (GPS) sensor or the like, the drone cannot return to the mother ship even with an intension to return. That is, in a case where the home point is set to a moving body, the aerial vehicle cannot return to the home point unless the aerial vehicle grasps the relative positional relationship between the aerial vehicle and the moving body.

(2) Second Problem

Figure 3A:
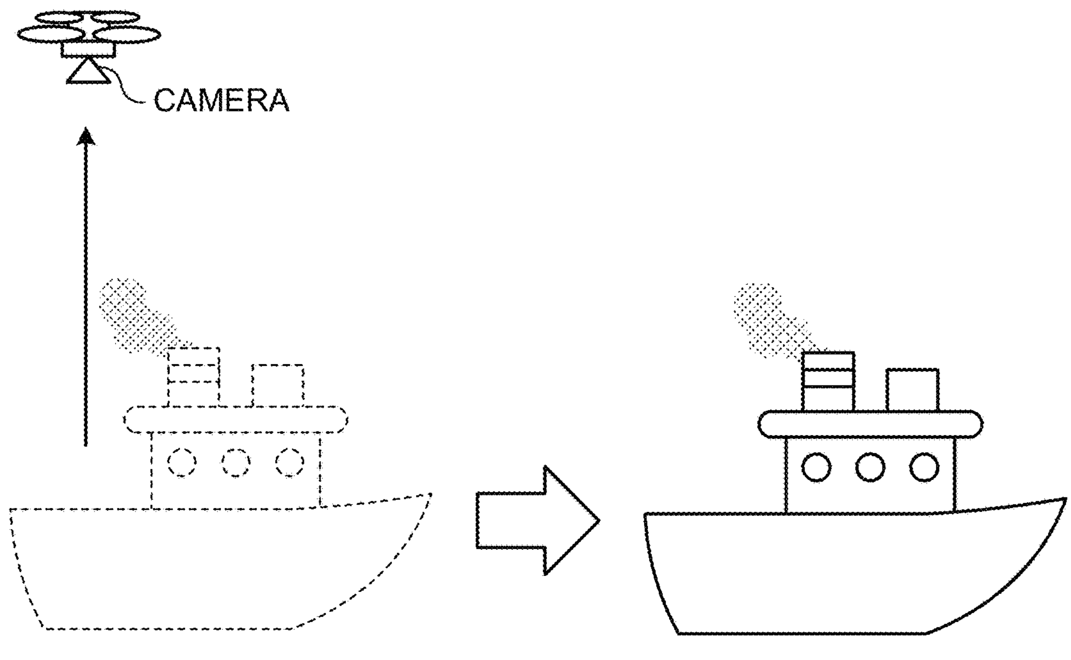
FIG. 3A is a diagram illustrating a second problem of the present embodiment.
Figure 3B:
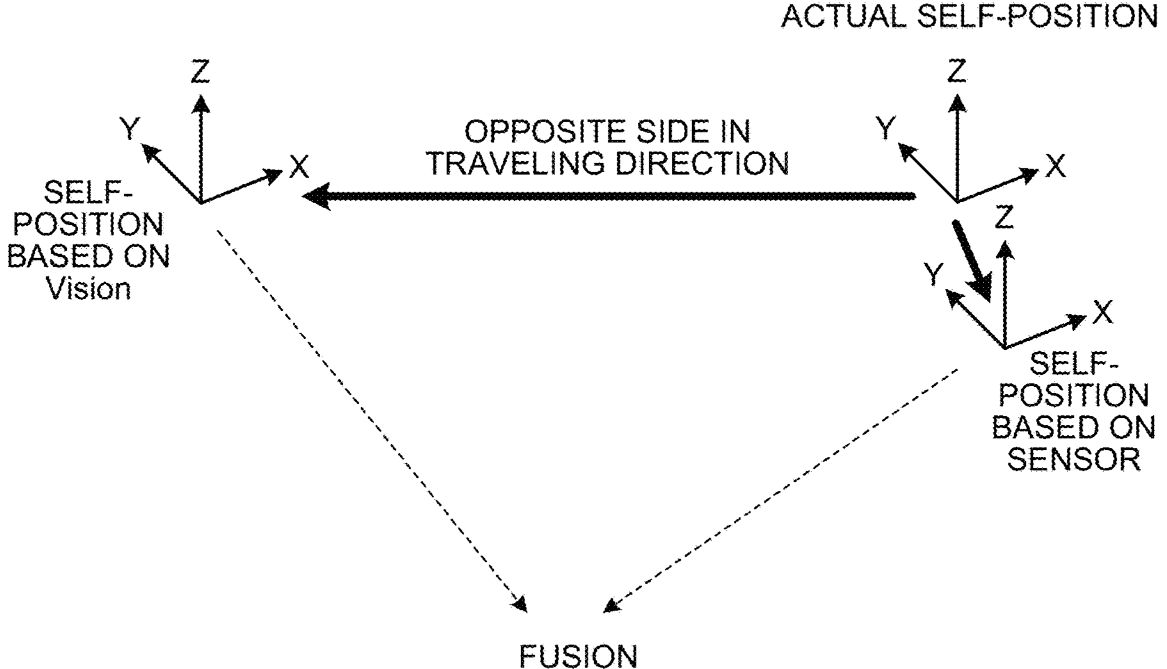
FIG. 3B is a diagram illustrating the second problem of the present embodiment.

The aerial vehicle performs estimation of own position or attitude (hereinafter, referred to as self-position estimation)

for the purpose such as avoidance of collision with the mother ship or RTH. Self-position estimation often uses vision information (for example, information of an image captured by a camera included in the aerial vehicle). In this case, capturing a moving object in the image would lead to unstable self-position estimation by the aerial vehicle. FIGS. 3A and 3B are diagrams illustrating a second problem of the present embodiment. FIG. 3A illustrates a state in which the drone has performed departure from the mother ship. In the example of FIG. 3A, the drone is the aerial vehicle, and the mother ship is the moving body.

After the departure from the mother ship, the drone starts hovering without moving when there is no instruction from the user. It is assumed that the drone performs self-position estimation in this state. Conventionally, a drone calculates its own position by fusing a self-position estimated using vision information with a self-position estimated using other sensors (for example, a GPS sensor, an Inertial Measurement Unit (IMU) or a barometer) using a filter such as an Extended Kalman Filter (EKF). Even if the object captured in the image is moving, it is assumed that the self-position estimated using a sensor such as a GPS sensor (referred to as a first self-position) is not much different from the actual position of the drone. However, the self-position estimated using vision information (hereinafter, referred to as a second self-position) is to be greatly shifted from the actual position of the drone when the object captured in the image is moving.

This will be specifically described with reference to FIG. 3B. FIG. 3B is a diagram illustrating a state in which conventional self-position estimation processing is applied to a case where an object captured in an image is moving. Immediately after take-off from the mother ship, vision information includes an image of substantially the mother ship alone, and thus the self-position calculated by the drone based on the vision information is a relative position with respect to the mother ship. Here, when the mother ship is moving, the drone has a misconception that the drone itself is moving to the opposite side in a traveling direction of the mother ship. Therefore, the second self-position ("self-position based on vision" illustrated in FIG. 3B) calculated by the drone is a position greatly shifted to the opposite side in the traveling direction of the mother ship. Fusing this second self-position with the first self-position ("the self-position based on sensor" illustrated in FIG. 3B) with no adjustment would result in unstable self-position estimation with contradiction. This leads to unstable flight control of the drone.

Figure 4:
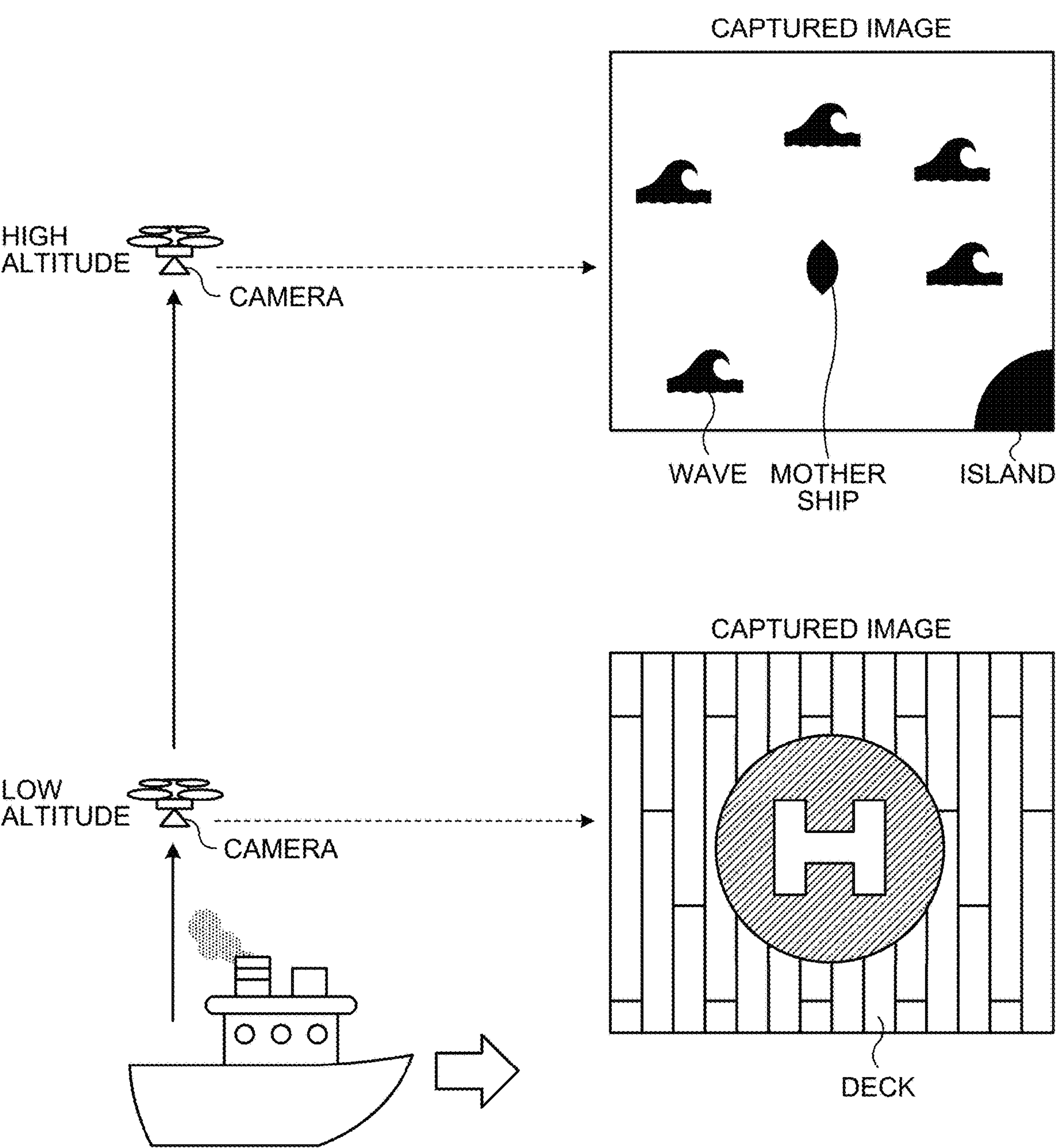
FIG. 4 is a diagram illustrating a situation in which self-position estimation based on vision information becomes difficult due to a change in conditions.

On the other hand, it is desirable to perform self-position estimation using vision information in order to avoid collision with the mother ship, RTH, and the like. However, since the condition related to the self-position estimation changes depending on the distance from the mother ship or altitude, it is difficult to estimate the relative position and the relative attitude with respect to the mother ship only with vision information. FIG. 4 is a diagram illustrating a situation in which self-position estimation based on vision information becomes difficult due to a change in conditions. At low altitude, an image of a mother ship portion is dominant in the image captured by the camera. Therefore, using vision information, the drone can easily estimate the relative position and the relative attitude with respect to the mother ship. However, at high altitude, objects with various movements (for example, waves) are captured in the image, which leads to unstable estimation of self-position unless information is properly segmented. In addition, since the mother ship is captured as a smaller object at higher altitude, making it more difficult to perform tracking of the mother ship.

(3) Third Problem

Figure 5:
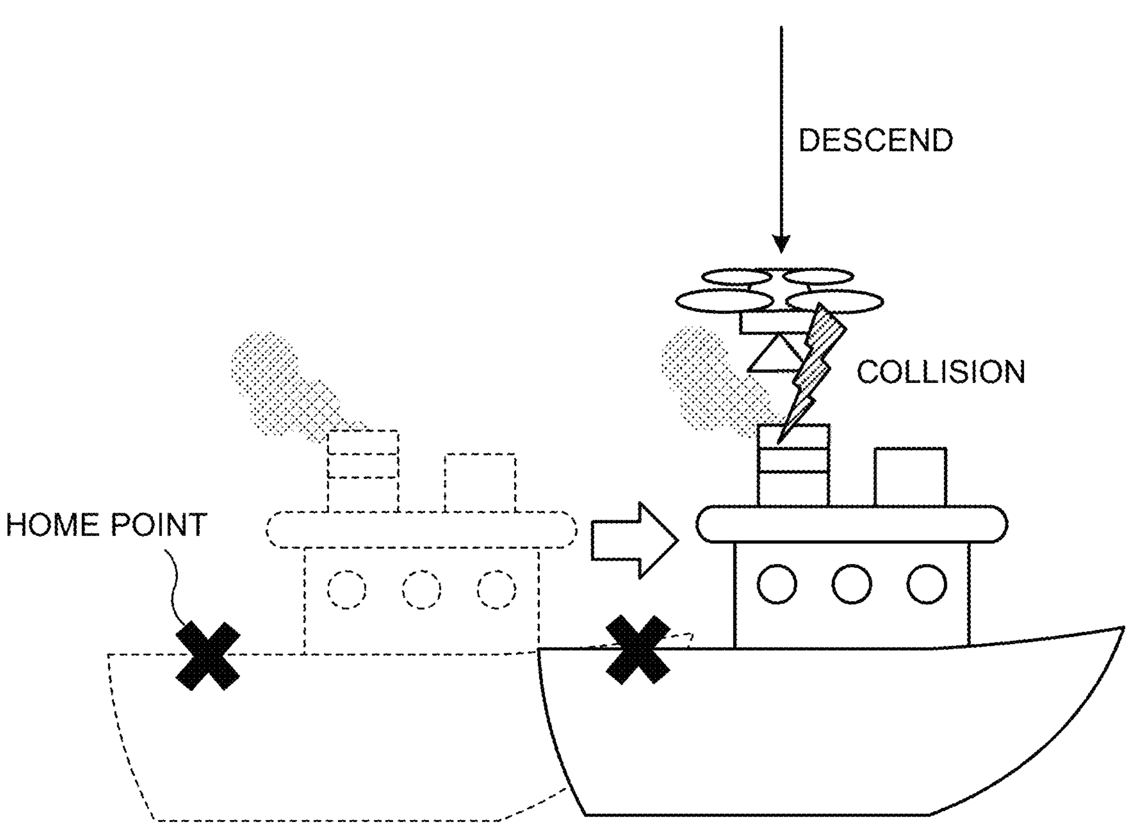
FIG. 5 is a diagram illustrating a third problem of the present embodiment.

FIG. 5 is a diagram illustrating a third problem of the present embodiment. FIG. 5 illustrates a state in which the drone lands on a mother ship. Also in the example of FIG. 5, the mother ship is moving. Therefore, since the position of the mother ship changes between when the drone starts to take a landing attitude and when the drone actually lands on the mother ship, the drone would collide with the mother ship in some cases. The similar applies to a case where the drone takes off from the mother ship.

1-2. Outline of Solution

Therefore, in the present embodiment, an information processing device (for example, a processor included in the aerial vehicle) that performs position estimation of an aerial vehicle uses an image classification technology such as semantic segmentation to classify an image captured by the aerial vehicle into a region to be used for self-position estimation and a region not to be used for self-position estimation. Subsequently, the information processing device performs self-position estimation based on the classified images. For example, the information processing device uses a moving body region (for example, a mother ship region) in the image to estimate a relative position and a relative attitude of the aerial vehicle with respect to the moving body. At this time, the information processing device does not use a moving region other than the mother ship, such as a person, a bird, or a wave, in self-position estimation. This makes it possible to perform self-position estimation with high accuracy even when the home point is moving, leading to reliable control of the aerial vehicle.

Furthermore, the information processing device switches the estimation method according to the distance of the aerial vehicle from the moving body (for example, the mother ship). For example, when the distance between the aerial vehicle and the moving body is shorter than a predetermined criterion, the information processing device estimates the relative position and the relative attitude with respect to the moving body based on the information regarding the moving body region in the image. In contrast, when the distance between the aerial vehicle and the moving body is longer than the predetermined criterion, it is difficult for the information processing device to accurately estimate the relative position and the relative attitude of the aerial vehicle, and thus, does not estimate the relative position or the relative attitude by vision information. Instead, the information processing device constantly tracks the moving body by using object detection by cameras disposed around the entire periphery of the aerial vehicle (or using moving body detection by bounding box). This makes it possible for the information processing device to constantly grasp the relative position between the aerial vehicle and the moving body, leading to achievement of reliable control of the flight of the aerial vehicle.

Furthermore, at the time of departure of the aerial vehicle, the information processing device does not simply allow the aerial vehicle to hover at a position, but causes the aerial vehicle to move using the information regarding the relative position and the relative attitude with respect to the moving body estimated from the vision information so as to keep constant positions of the moving body and the aerial vehicle at any time. This makes it possible for the aerial vehicle to perform the departure from the moving body without colliding with the moving body.

In addition, when the aerial vehicle returns, the information processing device also performs flight control of the aerial vehicle using information regarding the relative position and the relative attitude with respect to the moving body estimated from the vision information. Here, the information processing device retains a path in the departure of the aerial vehicle from the moving body (a path in a coordinate system relative to the moving body), and controls the flight of the aerial vehicle so as to follow the reverse of the retained path for the departure. This makes it possible for the aerial vehicle to return to the moving body without colliding with the moving body.

The outline of the present embodiment has been described above. Hereinafter, an aerial vehicle control system 1 according to the present embodiment will be described in detail. Note that the aerial vehicle control system can be rephrased as an information processing system.

2. Configuration of Aerial Vehicle Control System

First, an overall configuration of the aerial vehicle control system 1 will be described.

Figure 6:
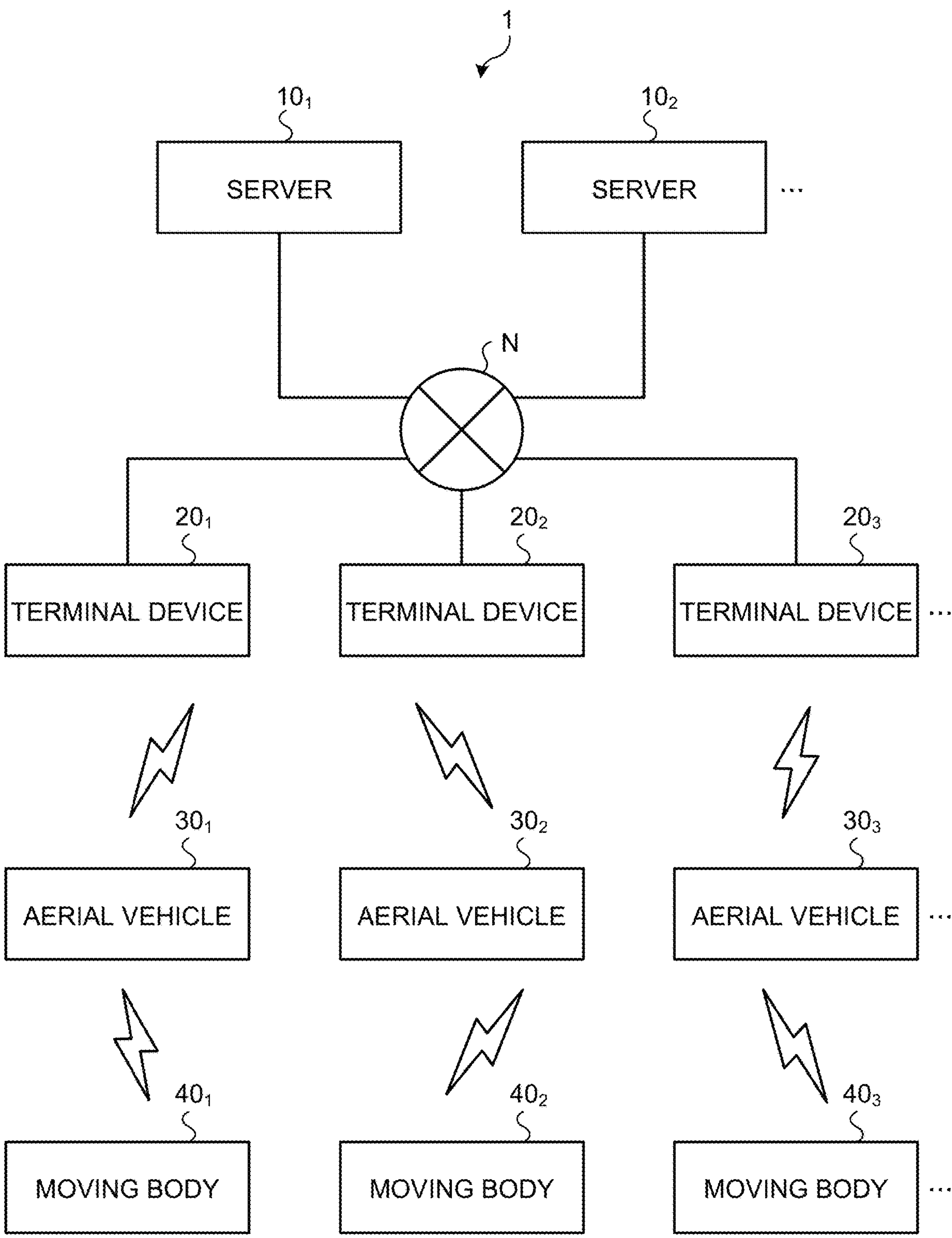
FIG. 6 is a diagram illustrating a configuration example of an aerial vehicle control system according to an embodiment of the present disclosure.

FIG. 6 is a diagram illustrating a configuration example of the aerial vehicle control system 1 according to the embodiment of the present disclosure. The aerial vehicle control system 1 is an information processing system that performs processing related to flight of the aerial vehicle 30. The aerial vehicle control system 1 includes a server 10, a terminal device 20, an aerial vehicle 30, and a moving body 40. The device in the figure may be considered as a device in a logical sense. That is, parts of the device in the drawing may be partially actualized by a virtual machine (VM), a container, a docker, or the like, and they may be implemented on physically the same piece of hardware.

The server 10 and the terminal device 20 each have a communication function and are connected via a network N. In addition, the aerial vehicle 30 and the moving body 40 each have a wireless communication function and are wirelessly connected with each other. Note that the aerial vehicle 30 and the moving body 40 may be wirelessly connected to the terminal device 20. The aerial vehicle 30 and the moving body 40 may be configured to be connectable to the network N. The server 10, the terminal device 20, the aerial vehicle 30, and the moving body 40 can be rephrased as communication devices. Although only one network N is illustrated in the example of FIG. 6, the network N may be provided in plurality.

Here, examples of the network N include communication networks such as a local area network (LAN), a wide area network (WAN), a cellular network, a fixed-line telephone network, a regional Internet protocol (IP) network, and the Internet. The network N may include a wired network or a wireless network. In addition, the network N may include a core network. Examples of the core network include an Evolved Packet Core (EPC) or a 5G Core network (5GC). In addition, the network N may include a data network other than the core network. The data network may be a service network of a telecommunications carrier, for example, an IP Multimedia Subsystem (IMS) network. Furthermore, the data network may be a private network such as an intranet.

The communication devices such as the terminal device 20, the aerial vehicle 30, and the moving body 40 may be configured to be connected to the network N or other communication devices using a radio access technology (RAT) such as long term evolution (LTE), New Radio (NR), Wi-Fi, or Bluetooth (registered trademark). At this time, the communication device may be configured to be able to use different types of radio access technologies. For example, the communication device may be configured to be able to use NR and Wi-Fi. Furthermore, the communication device may be configured to be able to use different types of cellular communication technology (for example, LTE and NR). LTE and NR are a type of cellular communication technology, and enable mobile communication of communication devices by using cellular arrangement of a plurality of areas covered by base stations.

The communication devices such as the server 10, the terminal device 20, the aerial vehicle 30, and the moving body 40 may be connectable to the network N or other communication devices using a radio access technology other than LTE, NR, Wi-Fi, and Bluetooth. For example, the communication device may be connectable to the network N or other communication devices by using Low Power Wide Area (LPWA) communication. Furthermore, the communication device may be connectable to the network N or other communication devices by using wireless communication of a proprietary standard. Obviously, the communication device may be connectable to the network N or other communication devices by using wireless communication of other known standards.

Hereinafter, the configuration of each device constituting the aerial vehicle control system 1 will be specifically described. The configuration of each device illustrated below is just an example. The configuration of each device may differ from the configuration below.

2-1. Configuration of Server

First, a configuration of the server 10 will be described.

The server 10 is an information processing device (computer) that performs processing related to flight control of the aerial vehicle 30. For example, the server 10 is a computer that performs automatic flight processing of the aerial vehicle 30 and estimation processing of the position and attitude of the aerial vehicle 30. The server 10 can be implemented by employing any form of computer. The server 10 may be a PC server, a midrange server, or a mainframe server.

Figure 7:
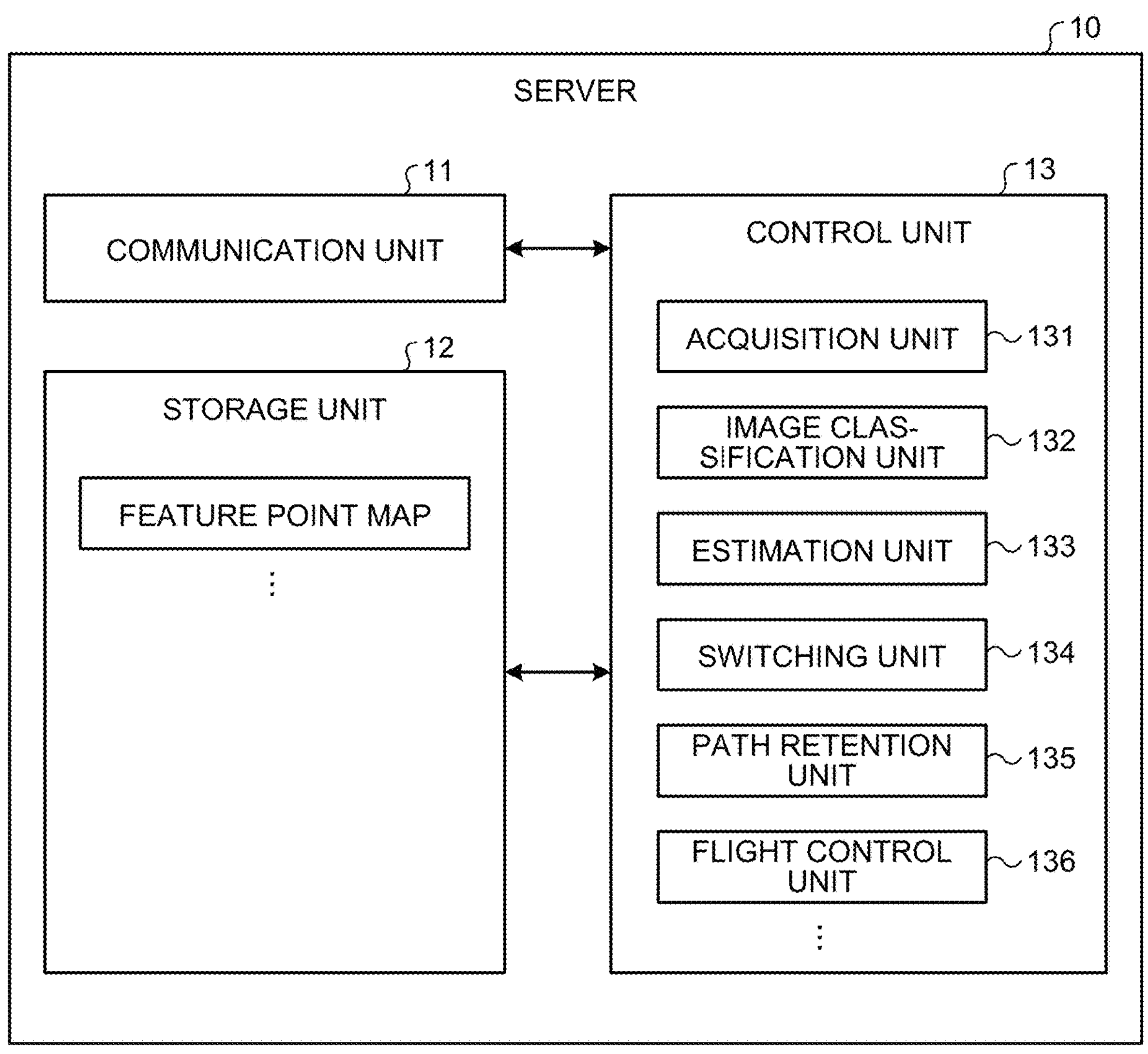
FIG. 7 is a diagram illustrating a configuration example of a server according to the embodiment of the present disclosure.

FIG. 7 is a diagram illustrating a configuration example of the server 10 according to the embodiment of the present disclosure. The server 10 includes a communication unit 11, a storage unit 12, and a control unit 13. Note that the configuration illustrated in FIG. 7 is a functional configuration, and the hardware configuration may be different from this. Furthermore, the functions of the server 10 may be installed in a distributed manner in a plurality of physically separated configurations. For example, the server 10 may be constituted with a plurality of server devices.

The communication unit 11 is a communication interface for communicating with other devices. An example of the communication unit 11 is a local area network (LAN) interface such as a Network Interface Card (NIC). The communication unit 11 may be a wired interface, or may be a wireless interface. The communication unit 11 communicates with the terminal device 20, the aerial vehicle 30, the moving body 40, and the like under the control of the control unit 13.

The storage unit 12 is a data readable/writable storage device such as dynamic random access memory (DRAM), static random access memory (SRAM), a flash drive, or a hard disk. The storage unit 12 functions as a storage means of the server 10. The storage unit 12 stores a feature point map, for example. The feature point map will be described below.

The control unit 13 is a controller that controls individual units of the server 10. The control unit 13 is implemented by a processor such as a central processing unit (CPU), a micro processing unit (MPU), or a graphics processing unit (GPU), for example. For example, the control unit 13 is implemented by execution of various programs stored in the storage device inside the server 10 by the processor using random access memory (RAM) or the like as a work area. Note that the control unit 13 may be implemented by an integrated circuit such as an application specific integrated circuit (ASIC) or a field programmable gate array (FPGA). The CPU, MPU, GPU, ASIC, and FPGA can all be regarded as controllers.

The control unit 13 includes an acquisition unit 131, an image classification unit 132, an estimation unit 133, a switching unit 134, a path retention unit 135, and a flight control unit 136. Each block (the acquisition unit 131 to the flight control unit 136) constituting the control unit 13 is a functional block indicating a function of the control unit 13. These functional blocks may be software blocks or hardware blocks. For example, each of the functional blocks described above may be one software module realized by software (including a microprogram) or one circuit block on a semiconductor chip (die). Needless to say, each of the functional blocks may be formed as one processor or one integrated circuit. Note that the control unit 13 may be configured in a functional unit different from the above-described functional block. The functional block may be configured by using any method.

Note that the control unit 13 may be configured in a functional unit different from the above-described functional block. In addition, part or all of the operations of the blocks (the acquisition unit 131 to the flight control unit 136) constituting the control unit 13 may be performed by other devices. For example, part or all of the operations of each block constituting the control unit 13 may be performed by one or a plurality of control units selected from the control unit 23 of the terminal device 20, the control unit 33 of the aerial vehicle 30, and the control unit 43 of the moving body 40. The operation of individual blocks constituting the control unit 13 will be described below.

2-2. Configuration of Terminal Device

Next, a configuration of the terminal device 20 will be described.

The terminal device 20 is a communication device that communicates with the server 10 and the aerial vehicle 30. For example, the terminal device 20 is a terminal carried by a user who manually operates the aerial vehicle 30. The terminal device 20 transmits control information for the user to control the aerial vehicle 30 to the aerial vehicle 30, for example. Furthermore, the terminal device 20 receives current states of the aerial vehicle 30 (for example, information regarding the position and attitude of the aerial vehicle 30) from the aerial vehicle 30, for example. The terminal device 20 may be configured to exchange, with the server 10, information for controlling the aerial vehicle 30 (for example, information for automatic flight control of the aerial vehicle 30 and information regarding the estimation of the position and attitude of the aerial vehicle 30).

Figure 8:
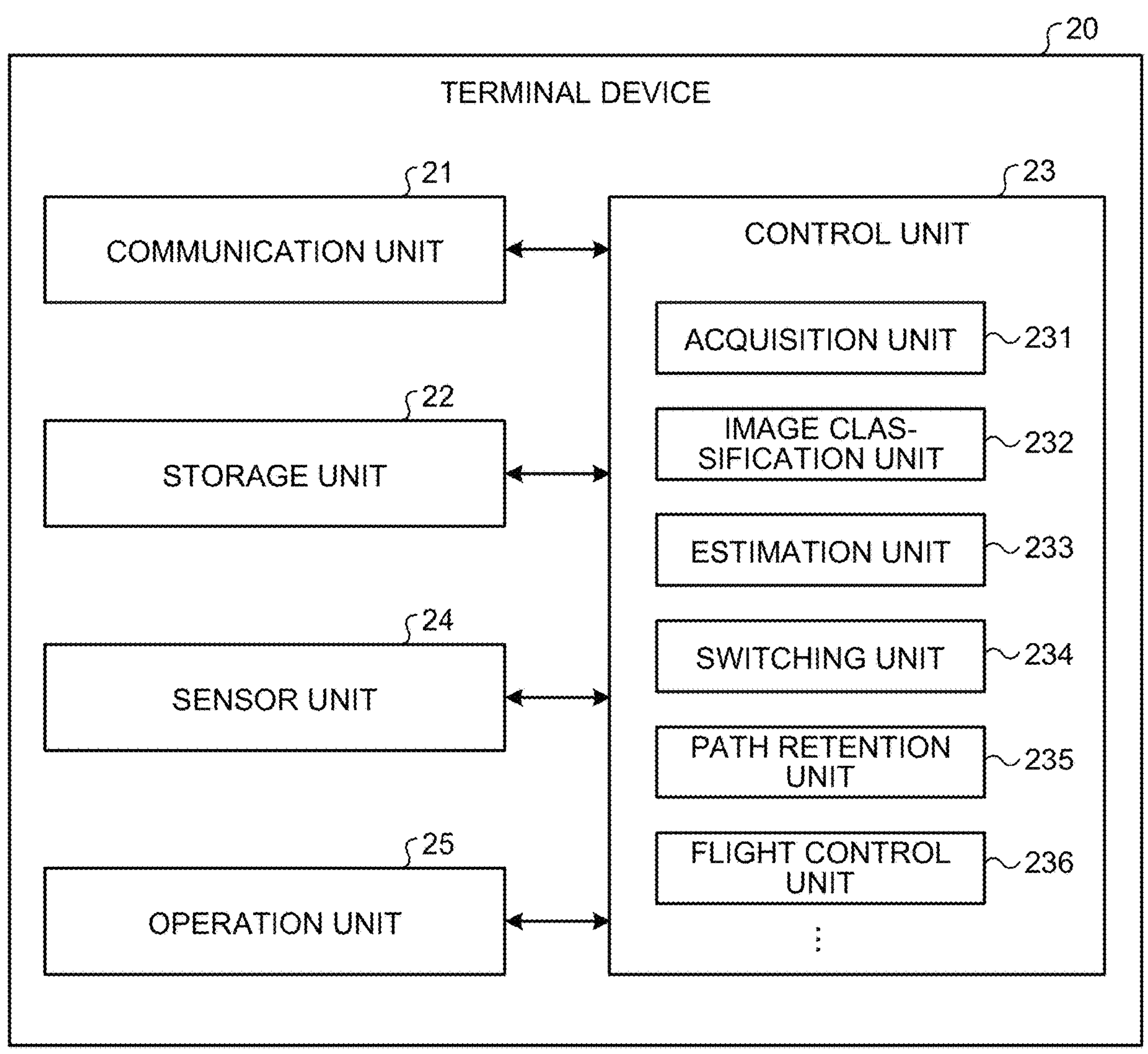
FIG. 8 is a diagram illustrating a configuration example of a terminal device according to the embodiment of the present disclosure.

The terminal device 20 is a proportional system used by the user to operate the aerial vehicle 30, for example. The terminal device 20 is not to be limited to the proportional system but may be devices such as a mobile phone, a smart device (smartphone or tablet), a personal digital assistant (PDA), or a personal computer. Furthermore, the terminal device 20 may be an imaging device (such as a cam-coder, for example) equipped with a communication function, or may be a moving body (such as a motorcycle and a moving relay vehicle) on which communication equipment such as a Field Pickup Unit (FPU) is mounted. The terminal device 20 may be a Machine to Machine (M2M) device or an Internet of Things (IoT) device. The terminal device 20 may be a router. Furthermore, the terminal device 20 may be an xR device such as an augmented reality (AR) device, a virtual reality (VR) device, or a mixed reality (MR) device. Furthermore, the terminal device 20 may be a wearable device such as a smart watch. FIG. 8 is a diagram illustrating a configuration example of the terminal device 20 according to the embodiment of the present disclosure. The terminal device 20 includes a communication unit 21, a storage unit 22, a control unit 23, a sensor unit 24, and an operation unit 25. Note that the configuration illustrated in FIG. 8 is a functional configuration, and the hardware configuration may be different from this. Furthermore, the functions of the terminal device 20 may be installed in a distributed manner in a plurality of physically separated configurations.

The communication unit 21 is a communication interface for communicating with other devices. For example, the communication unit 21 is a LAN interface such as an NIC. The communication unit 21 may be a wired interface, or may be a wireless interface. The communication unit 21 communicates with the server 10, the aerial vehicle 30, the moving body 40, and the like under the control of the control unit 23.

The storage unit 22 is a data readable/writable storage device such as DRAM, SRAM, a flash drive, and a hard disk. The storage unit 22 functions as a storage means in the terminal device 20. The storage unit 22 stores a feature point map, for example.

The control unit 23 is a controller that controls individual parts of the terminal device 20. The control unit 23 is actualized by a processor such as a CPU, an MPU, and a GPU, for example. For example, the control unit 23 is implemented by a processor executing various programs stored in a storage device inside the terminal device 20 using RAM or the like as a work area. Note that the control unit 23 may be actualized by an integrated circuit such as an ASIC or an FPGA. The CPU, MPU, GPU, ASIC, and FPGA can all be regarded as controllers.

The control unit 23 includes an acquisition unit 231, an image classification unit 232, an estimation unit 233, a switching unit 234, a path retention unit 235, and a flight control unit 236. Each block (the acquisition unit 231 to the flight control unit 236) constituting the control unit 23 is a functional block indicating a function of the control unit 23. These functional blocks may be software blocks or hardware blocks. For example, each of the functional blocks described above may be one software module realized by software (including a microprogram) or one circuit block on a semiconductor chip (die). Needless to say, each of the functional blocks may be formed as one processor or one integrated circuit. Note that the control unit 23 may be configured in a functional unit different from the above-described functional block. The functional block may be configured by using any method.

Note that the control unit 23 may be configured in a functional unit different from the above-described functional block. In addition, part or all of the operations of the blocks (the acquisition unit 231 to the flight control unit 236)

constituting the control unit 23 may be performed by other devices. For example, part or all of the operations of each block constituting the control unit 23 may be performed by one or a plurality of control units selected from the control unit 13 of the server 10, the control unit 33 of the aerial vehicle 30, and the control unit 43 of the moving body 40.

The sensor unit 24 is a sensor that acquires information related to the position or attitude of the terminal device 20. For example, the sensor unit 24 is a global navigation satellite system (GNSS) sensor. Here, the GNSS sensor may be a global positioning system (GPS) sensor, a GLONASS sensor, a Galileo sensor, or a quasi-zenith satellite system (QZSS) sensor. The GNSS sensor can be rephrased as a GNSS receiving module. Note that the sensor unit 24 is not limited to the GNSS sensor, and may be an acceleration sensor, for example. Furthermore, the sensor unit 24 may be a combination of a plurality of sensors.

The operation unit 25 is an operation device for a user to perform various operations. For example, the operation unit 25 includes a lever, a button, a keyboard, a mouse, an operation key, and the like. In a case where a touch panel is adopted as the terminal device 20, the touch panel is also included in the operation unit 25. In this case, the user performs various operations by touching the screen with a finger or a stylus.

2-3. Configuration of Aerial Vehicle

Next, a configuration of aerial vehicle 30 will be described.

The aerial vehicle 30 is an aerial vehicle configured to automatically return to a home point on the moving body 40 in a case where a predetermined condition is satisfied (for example, when separated away from the home point by a predetermined distance). The aerial vehicle 30 may be configured to fly completely automatically, or may be configured to be manually operated by a user.

The aerial vehicle 30 is typically a drone, but need not necessarily be a drone. For example, the aerial vehicle 30 may be a moving body that moves in the atmosphere other than the drone. For example, the aerial vehicle 30 may be an aircraft such as an airplane, an airship, or a helicopter. The concept of the aircraft includes not only heavy aircraft such as an airplane and a glider but also light aircraft such as a balloon and an airship. In addition, the concept of the aircraft includes not only a heavy aircraft and a light aircraft but also a rotorcraft such as a helicopter and an auto-gyro.

Note that the aerial vehicle 30 may be a manned aircraft or an unmanned aircraft. Note that the concept of the unmanned aircraft also includes an unmanned aircraft system (UAS) and a tethered UAS. The concept of unmanned aircraft also includes a Lighter-than-Air (LTA) unmanned aircraft system (UAS) and a Heavier-than-Air (HTA) unmanned aircraft system (UAS). Other concepts of unmanned aircraft also include High Altitude Platforms (HAPs) unmanned aircraft system (UAS). A drone is a type of unmanned aircraft.

Furthermore, the aerial vehicle 30 may be a moving body that moves outside the atmosphere. For example, the aerial vehicle 30 may be an artificial astronomic object such as an artificial satellite, a spaceship, a space station, or a probe vehicle.

Figure 9:
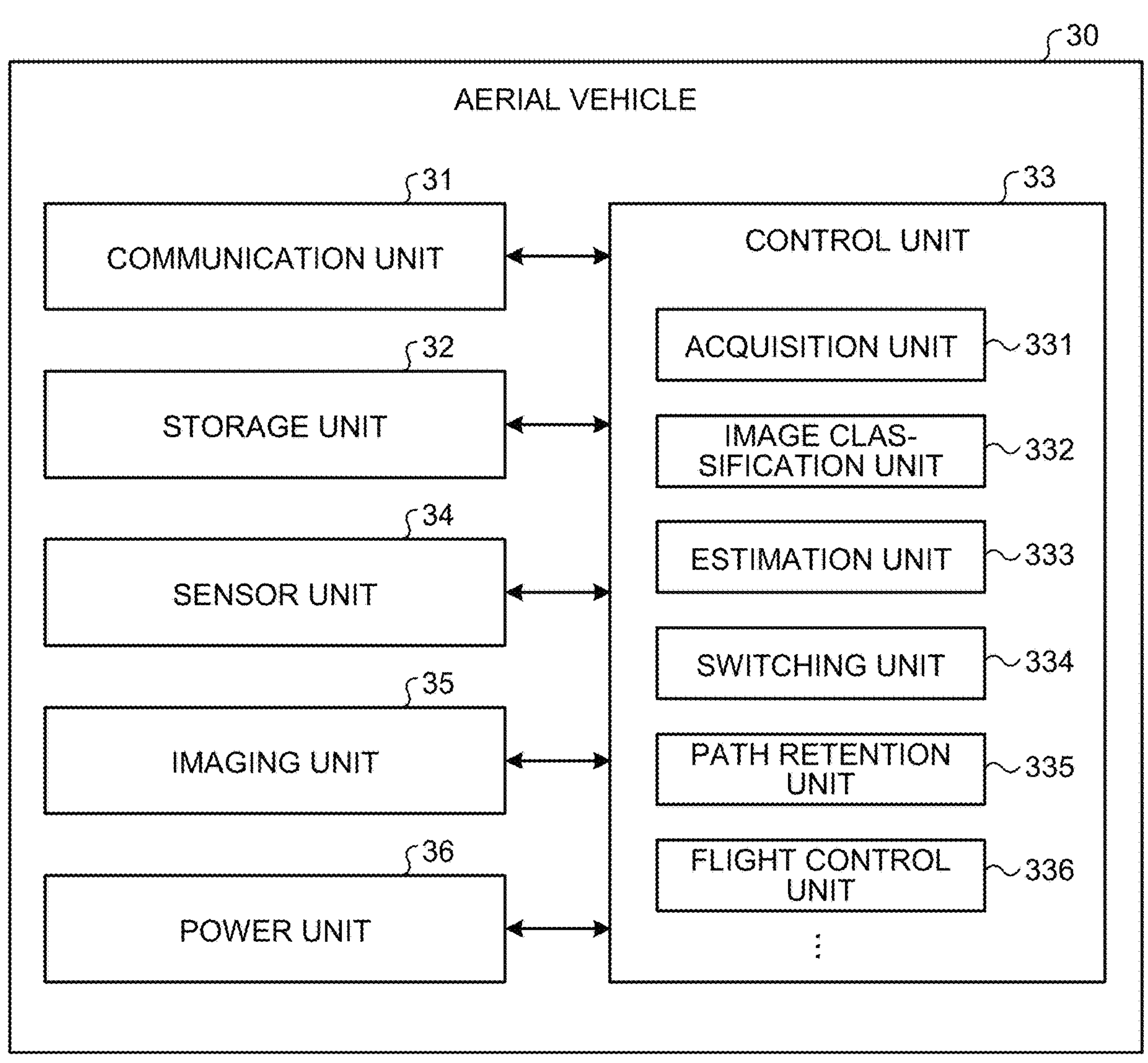
FIG. 9 is a diagram illustrating a configuration example of an aerial vehicle according to the embodiment of the present disclosure.

FIG. 9 is a diagram illustrating a configuration example of the aerial vehicle 30 according to the embodiment of the present disclosure. The aerial vehicle 30 includes a communication unit 31, a storage unit 32, a control unit 33, a sensor unit 34, an imaging unit 35, and a power unit 36. Note that the configuration illustrated in FIG. 9 is a functional configuration, and the hardware configuration may be different from this. Furthermore, the functions of the aerial vehicle 30 may be installed in a distributed manner in a plurality of physically separated configurations.

The communication unit 41 is a communication interface for communicating with other devices. For example, the communication unit 41 is a LAN interface such as an NIC. The communication unit 41 may be a wired interface, or may be a wireless interface. The communication unit 41 communicates with the server 10, the terminal device 20, the aerial vehicle 30, and the like under the control of the control unit 33.

The storage unit 42 is a data readable/writable storage device such as DRAM, SRAM, a flash drive, and a hard disk. The storage unit 42 functions as storage means of the aerial vehicle 30. The storage unit 42 stores a feature point map, for example.

The control unit 33 is a controller that controls individual parts of the aerial vehicle 30. The control unit 33 is actualized by a processor such as a CPU, an MPU, and a GPU, for example. For example, the control unit 33 is implemented by a processor executing various programs stored in a storage device inside the aerial vehicle 30 using RAM or the like as a work area. Note that the control unit 33 may be implemented by an integrated circuit such as an ASIC or an FPGA. The CPU, MPU, GPU, ASIC, and FPGA can all be regarded as controllers.

The control unit 33 includes an acquisition unit 331, an image classification unit 332, an estimation unit 333, a switching unit 334, a path retention unit 335, and a flight control unit 336. Each block (the acquisition unit 331 to the flight control unit 336) constituting the control unit 33 is a functional block indicating a function of the control unit 33. These functional blocks may be software blocks or hardware blocks. For example, each of the functional blocks described above may be one software module realized by software (including a microprogram) or one circuit block on a semiconductor chip (die). Needless to say, each of the functional blocks may be formed as one processor or one integrated circuit. Note that the control unit 33 may be configured in a functional unit different from the above-described functional block. The functional block may be configured by using any method.

Note that the control unit 33 may be configured in a functional unit different from the above-described functional block. In addition, part or all of the operations of the blocks (the acquisition unit 331 to the flight control unit 336) constituting the control unit 33 may be performed by other devices. For example, part or all of the operations of each block constituting the control unit 33 may be performed by one or a plurality of control units selected from the control unit 13 of the server 10, the control unit 23 of the terminal device 20, and the control unit 43 of the moving body 40.

The imaging unit 35 is a converter that converts an optical image into an electric signal. The imaging unit 35 includes components such as an image sensor and a signal processing circuit that processes an analog pixel signal output from the image sensor, for example, and converts light entering through the lens into digital data (image data). Note that the image captured by the imaging unit 35 is not limited to a video (moving image), and may be a still image. Note that the imaging unit 35 may be a camera. At this time, the imaging unit 35 can be referred to as a first person view (FPV) camera.

The sensor unit 34 is a sensor that acquires information related to the position or attitude of the aerial vehicle 30. For example, the sensor unit 34 is a GNSS sensor. Here, the GNSS sensor may be a GPS sensor, a GLONASS sensor, a Galileo sensor, or a QZSS sensor. The GNSS sensor can be rephrased as a GNSS receiving module. Note that the sensor unit 34 is not limited to the GNSS sensor, and may be an acceleration sensor, for example. Furthermore, the sensor unit 34 may be an inertial measurement unit (IMU), a barometer, or a geomagnetic sensor. Furthermore, the sensor unit 34 may be a combination of a plurality of sensors.

The power unit 36 provides power that enables the aerial vehicle 30 to fly. For example, the power unit 36 is a motor that drives various mechanisms included in the aerial vehicle 30.

2-4. Configuration of Moving Body

Next, a configuration of the moving body 40 will be described.

The moving body 40 is a device on which a home point of the aerial vehicle 30 is set. The moving body 40 itself may be the home point of the aerial vehicle 30. The home point is a place where the aerial vehicle 30 should return. For example, the home point is a target point of the return. The home point can be rephrased as a return target, a landing target, a return point, a landing point, or the like.

The moving body 40 may be a moving body that moves on the land (for example, a vehicle such as an automobile, a motorcycle, a bus, a truck, a motorbike, a train, or a linear motor car), or a moving body (for example, subway) that moves under the ground (for example, through a tunnel). The moving body 40 may be a moving body that moves on water (for example, a ship such as a passenger ship, a cargo ship, and a hovercraft), or a moving body that moves underwater (for example, a submersible ship such as a submersible boat, a submarine, or an unmanned submarine). Furthermore, the moving body 40 may be a moving body that moves in the atmosphere (for example, an aircraft such as an airplane, an airship, a helicopter, or a drone), or may be a moving body that moves outside the atmosphere (for example, an artificial astronomic object such as an artificial satellite, a spaceship, a space station, or a probe vehicle). Note that a structure (for example, a moving Mega-Float) which is movable is also a moving body.

Figure 10:
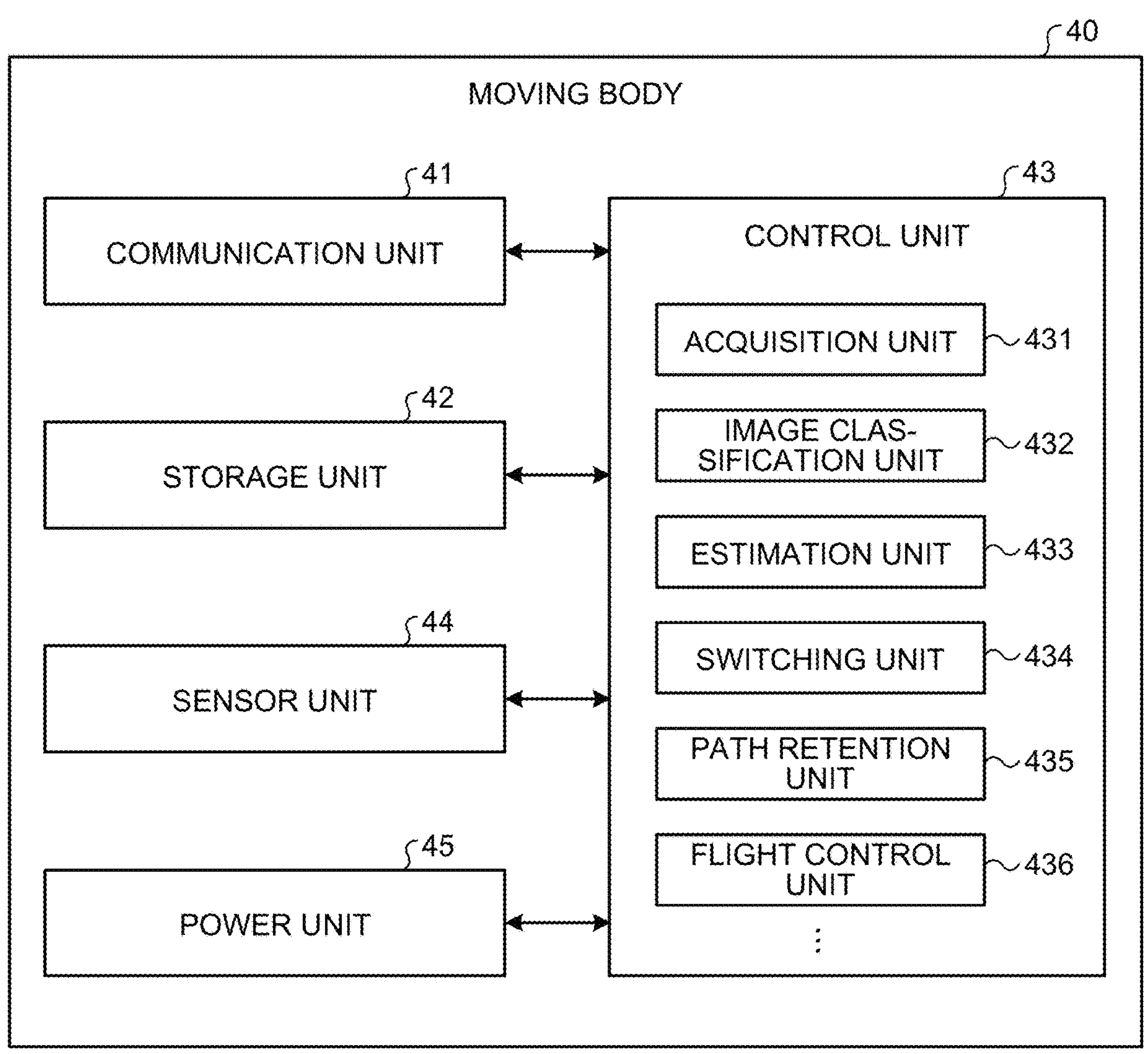
FIG. 10 is a diagram illustrating a configuration example of a moving body according to the embodiment of the present disclosure.

FIG. 10 is a diagram illustrating a configuration example of the moving body 40 according to the embodiment of the present disclosure. The moving body 40 includes a communication unit 41, a storage unit 42, a control unit 43, a sensor unit 44, and a power unit 45. Note that the configuration illustrated in FIG. 10 is a functional configuration, and the hardware configuration may be different from this. Furthermore, the functions of the moving body 40 may be installed in a distributed manner in a plurality of physically separated configurations.

The communication unit 41 is a communication interface for communicating with other devices. For example, the communication unit 41 is a LAN interface such as an NIC. The communication unit 41 may be a wired interface, or may be a wireless interface. The communication unit 41 communicates with the server 10, the terminal device 20, the aerial vehicle 30, and the like under the control of the control unit 43.

The storage unit 42 is a data readable/writable storage device such as DRAM, SRAM, a flash drive, and a hard disk. The storage unit 42 functions as a storage means in the moving body 40. The storage unit 42 stores a feature point map, for example.

The control unit 43 is a controller that controls individual parts of the moving body 40. The control unit 43 is actualized by a processor such as a CPU, an MPU, and a GPU, for example. For example, the control unit 43 is implemented by a processor executing various programs stored in a storage device inside the moving body 40 using RAM or the like as a work area. Note that the control unit 43 may be actualized by an integrated circuit such as an ASIC or an FPGA. The CPU, MPU, GPU, ASIC, and FPGA can all be regarded as controllers.

The control unit 43 includes an acquisition unit 431, an image classification unit 432, an estimation unit 433, a switching unit 434, a path retention unit 435, and a flight control unit 436. Each block (the acquisition unit 431 to the flight control unit 436) constituting the control unit 43 is a functional block indicating a function of the control unit 43. These functional blocks may be software blocks or hardware blocks. For example, each of the functional blocks described above may be one software module realized by software (including a microprogram) or one circuit block on a semiconductor chip (die). Needless to say, each of the functional blocks may be formed as one processor or one integrated circuit. Note that the control unit 43 may be configured in a functional unit different from the above-described functional block. The functional block may be configured by using any method.

Note that the control unit 43 may be configured in a functional unit different from the above-described functional block. In addition, part or all of the operations of the blocks (the acquisition unit 431 to the flight control unit 436) constituting the control unit 43 may be performed by other devices. For example, part or all of the operations of each block constituting the control unit 43 may be performed by one or a plurality of control units selected from the control unit 13 of the server 10, the control unit 23 of the terminal device 20, and the control unit 33 of the aerial vehicle 30.

The sensor unit 44 is a sensor that acquires information related to the position or attitude of the moving body 40. For example, the sensor unit 44 is a GNSS sensor. Here, the GNSS sensor may be a GPS sensor, a GLONASS sensor, a Galileo sensor, or a QZSS sensor. The GNSS sensor can be rephrased as a GNSS receiving module. Note that the sensor unit 44 is not limited to the GNSS sensor, and may be an acceleration sensor, for example. Furthermore, the sensor unit 44 may be a combination of a plurality of sensors.

The power unit 45 is power that enables the moving body 40 to move. For example, the power unit 45 is a motor that drives various mechanisms included in the moving body 40.

3. Operation of Aerial Vehicle Control System

The configuration of the aerial vehicle control system 1 has been described above. Next, the operation of the aerial vehicle control system 1 having such a configuration will be described.

3-1. Outline of Processing

First, an outline of processing of the aerial vehicle control system 1 will be described. The processing of the aerial vehicle control system 1 is divided into the following (1) to (4).

(1) Use of image classification processing
(2) Switching estimation method
(3) Take-off and landing control
(4) Automatic return control In the following description, a device that performs the above processing (1) to (4) may be referred to as an information processing device. Here, the information processing device may be the server 10, the terminal device 20, the aerial vehicle 30, or the moving body 40. Hereinafter, an outline of each of the above (1) to (4) will be described.

(1) Use of Image Classification Processing

The information processing device performs classification processing of images captured by the aerial vehicle 30 using an image classification technology such as semantic segmentation. For example, the information processing device may classify an image captured by the aerial vehicle 30 into a region of the moving body 40 (for example, a mother ship region), a stationary structure region (for example, a region such as land, vegetation, or a building), a region of a moving object other than the moving body 40 (region such as a ship, a car, a person, a bird, a wave, or an aerial vehicle), and other regions that are not to be well handled by self-position estimation processing (for example, a region such as a water surface).

Subsequently, the information processing device performs self-position estimation based on the classified images. At this time, the information processing device segments information to be used for self-position estimation based on the type of classified regions. For example, the information processing device uses the region of the moving body 40 in the image (for example, the mother ship region) to estimate a relative position and a relative attitude with respect to the moving body 40. In addition, the information processing device is used to estimate an absolute position and an absolute attitude of the stationary structure region. The absolute position and the absolute attitude are a position and an attitude viewed from a stationary coordinate system (Earth coordinate system). At this time, the information processing device may fuse the self-position (absolute position and absolute attitude) estimated by the stationary structure region with the self-position (absolute position and absolute attitude) estimated from a device such as a GNSS sensor, an IMU, and a barometer, for example. Note that a region of a moving object other than the moving body 40 is not to be used for self-position estimation by the information processing device.

With this configuration, even in a case where the home point is moving, the information processing device can perform highly accurate self-position estimation. This makes it possible to perform reliable flight control of the aerial vehicle 30.

(2) Switching Estimation Method

The information processing device switches the estimation method according to the distance of the aerial vehicle 30 from the moving body 40.

(Estimation Method in Case of Short Distance)

For example, in a case where the distance between the moving body 40 and the aerial vehicle 30 is shorter than a predetermined distance, the information processing device estimates the relative position and the relative attitude of the aerial vehicle 30 with respect to the moving body 40 based on the information regarding the region of the moving body 40 in the image.

(Estimation Method in Case of Long Distance)

In contrast, in a case where the distance between the moving body 40 and the aerial vehicle 30 is longer than the predetermined distance, it is difficult for the information processing device to accurately estimate the relative position and the relative attitude, and thus, does not estimate the relative position or the relative attitude by vision information. Instead, the information processing device constantly tracks the moving body 40 by using object detection by cameras disposed around the entire periphery of the aerial vehicle 30. For example, the information processing device performs tracking of the moving body 40 by a bounding box. Incidentally, the information processing device may track only the direction in which the moving body 40 is present, or may cause an FPV camera having a gimbal mechanism mounted on the aerial vehicle 30 to perform the tracking of the moving body 40.

(Switching Estimation Method)

The information processing device switches the estimation method based on information related to the distance between the moving body 40 and the aerial vehicle 30.

For example, the information processing device recognizes the current altitude of the aerial vehicle 30 from the detection result of the GNSS sensor, the barometer, or the like. When the current altitude of the aerial vehicle 30 reaches a predetermined altitude, the information processing device may switch the estimation method from the estimation method for the short distance to the estimation method for the long distance.

Furthermore, the information processing device estimates the distance between the aerial vehicle 30 and the moving body 40 from the sensing cameras disposed around the entire periphery of the aerial vehicle 30. When the estimated distance between the aerial vehicle 30 and the moving body 40 reaches a predetermined distance, the information processing device may switch the estimation method from the estimation method for the short distance to the estimation method for the long distance.

Furthermore, the information processing device calculates a ratio of a region of the moving body 40 in the image captured by the aerial vehicle 30 based on a result of image classification by semantic segmentation or the like. When the ratio of the region of the moving body 40 in the captured image falls below a predetermined ratio, the information processing device may switch the estimation method from the estimation method for the short distance to the estimation method for the long distance.

This makes it possible for the information processing device to constantly grasp the relative position and the relative attitude of the aerial vehicle 30 and the moving body 40. This makes it possible to perform reliable flight control of the aerial vehicle 30.

(3) Take-Off and Landing Control

At the time of take-off of the aerial vehicle 30 from the moving body 40, the information processing device controls the flight of the aerial vehicle 30 so as to cancel the movement of the moving body 40 based on the information regarding the relative position and the relative attitude of the aerial vehicle 30 estimated from the vision information. This makes it possible for the aerial vehicle 30 to perform take-off from the moving body 40 without colliding with the moving body 40. Similarly, at the time of landing of the aerial vehicle 30 on the moving body 40, the information processing device controls the flight of the aerial vehicle 30 so as to cancel the movement of the moving body 40 based on the information regarding the relative position and the relative attitude of the aerial vehicle 30 estimated from the vision information. This makes it possible for the aerial vehicle 30 to perform landing on the moving body 40 without colliding with the moving body 40.

(4) Automatic Return Control

The information processing device controls the aerial vehicle 30 to return to the moving body 40 based on the information regarding the relative position and the relative attitude with respect to the moving body estimated from the vision information. Here, the information processing device may store information related to a path when the aerial vehicle 30 performs a departure from the moving body 40 (a path in a coordinate system based on the moving body 40), and may control the flight of the aerial vehicle 30 at the time of return so as to follow the reverse of the path used at the time of departure.

For example, when the aerial vehicle 30 performs a departure from the moving body 40, the information processing device holds information of images obtained by imaging the moving body 40 from the aerial vehicle 30 at regular distance intervals based on information of a relative distance between a home point on the moving body 40 and the aerial vehicle 30. At activation of RTH, the information processing device controls the aerial vehicle 30 to move in the direction of the moving body 40 being tracked, thereby allowing the aerial vehicle 30 to move to the vicinity above the moving body 40. Thereafter, the information processing device controls the aerial vehicle 30 to move to a predetermined point (a point at which it is possible to check the matching between the current captured image and held image information) based on vision information. Subsequently, the information processing device checks the matching between the current captured image of the aerial vehicle 30 and the captured image held while maintaining the relative speed of the aerial vehicle 30 with the moving body 40 constant, and controls the aerial vehicle 30 to return to the home point along the same path as at the time of departure.

This makes it possible for the aerial vehicle 30 to return to the moving body 40 without colliding with the moving body 40.

The outline of the processing of the aerial vehicle control system 1 has been described as above. Now, the processing of the aerial vehicle control system 1 will be described in detail below.

3-2. Use of Image Classification Processing

First, use of the image classification processing will be described.

The information processing device classifies an image captured by the aerial vehicle 30 into a plurality of regions by a predetermined image classification technology. Here, the predetermined image classification technology is, for example, semantic segmentation or instance segmentation. The information processing device estimates attribute information of an object in units of pixels based on an image using a neural network such as a convolutional neural network (CNN), for example.

Figure 11A:
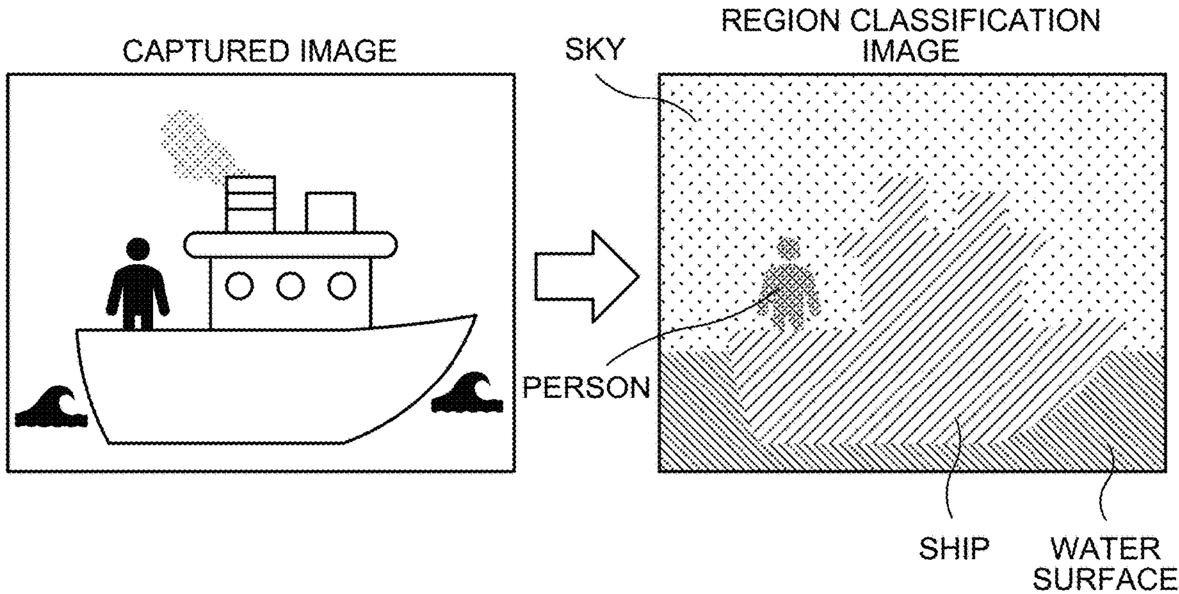
FIG. 11A is a diagram illustrating image classification processing.
Figure 11B:
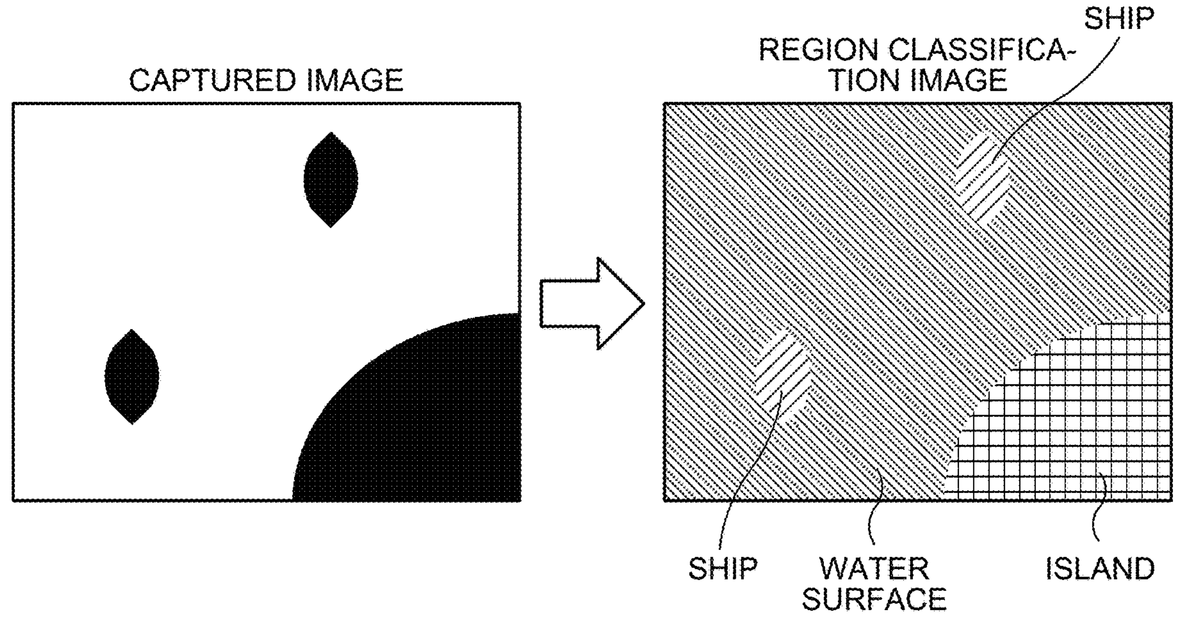
FIG. 11B is a diagram illustrating image classification processing.

FIGS. 11A and 11B are diagrams illustrating image classification processing. FIG. 11A is a diagram illustrating an image captured by the aerial vehicle 30 when the aerial vehicle 30 is close to the moving body 40 (captured image illustrated in FIG. 11A) and a result of classifying the image by semantic segmentation (region classification image illustrated in FIG. 11A). FIG. 11B is a diagram illustrating an image captured by the aerial vehicle 30 when the aerial vehicle 30 is far away from the moving body 40 (captured image illustrated in FIG. 11B) and a result of classifying the image by semantic segmentation (image classification image illustrated in FIG. 11B). Although the region classification images illustrated in FIGS. 11A and 11B indicate classification results by hatching, actual region classification images may indicate the classification result by colors.

The information processing device performs self-position estimation based on the region classification images as illustrated in FIGS. 11A and 11B. At this time, the information processing device may segment the self-position estimation method based on the information related to the distance between the aerial vehicle 30 and the moving body 40.

For example, when the aerial vehicle 30 is close to the moving body 40 (for example, when the aerial vehicle 30 satisfies a predetermined criterion regarding closeness in distance to the moving body 40), the information processing device estimates the relative position or the relative attitude of the aerial vehicle 30 relative to the moving body 40 by using an estimation method based on a coordinate system with respect to the moving body 40 (relative coordinate system). For example, when the aerial vehicle 30 is close to the moving body 40, the information processing device estimates the relative position or the relative attitude of the aerial vehicle 30 by using only the information of the region of the moving body 40 in the image.

In contrast, when the aerial vehicle 30 is far away from the moving body 40 (for example, when the aerial vehicle 30 does not satisfy a predetermined criterion regarding closeness in distance to the moving body 40), the information processing device estimates the relative position or the relative attitude of the aerial vehicle 30 with respect to the moving body 40 by using an estimation method based on a stationary coordinate system (Earth coordinate system). For example, when the aerial vehicle 30 is far away from the moving body 40, the information processing device estimates the relative position or the relative attitude of the aerial vehicle 30 using information regarding the region of the moving body 40 in the image but also information regarding regions other than the region of the moving body 40 in the image. More specifically, in addition to the region of the moving body 40, the information processing device uses regions of stationary structures such as islands or bridges for self-position estimation.

For self-position estimation, the information processing device does not use a region that causes reduction in estimation accuracy. For example, the information processing device does not use, in self-position estimation, a region (such as a region of water in the example of FIG. 11B) that is not to be well handled by self-position estimation processing or a region of moving objects other than the moving body 40 (a region of a ship other than the ship (mother ship) to be the moving body 40 among the two ships in the example of FIG. 11B). Note that attribute information of a region not to be well handled by self-position estimation processing may be set in advance in the information processing device.

Note that the "predetermined criterion regarding closeness in distance to the moving body 40" may be, for example, a criterion that the distance between the aerial vehicle 30 and the moving body 40 is shorter than a predetermined distance. That is, the information processing device may determine that the aerial vehicle satisfies the predetermined criterion in a case where the distance between the aerial vehicle 30 and the moving body 40 is shorter than a predetermined distance.

Here, the predetermined criterion may be a criterion different between the time of departure and the time of return of the aerial vehicle 30 from and to the moving body 40. For example, when the aerial vehicle 30 departs from the moving body 40, the predetermined criterion may be set as a first criterion (for example, the distance between the aerial vehicle 30 and the moving body 40 is shorter than the first distance), and when the aerial vehicle 30 returns to the moving body 40, the predetermined criterion may be set as a second criterion different from the first criterion (for example, the distance between the aerial vehicle 30 and the moving body 40 is shorter than a second distance different from the first distance). Here, the first distance may be longer or shorter than the second distance.

Note that the predetermined criterion may be a criterion same for the time of departure and the time of return of the aerial vehicle 30 from and to the moving body 40. That is, the first criterion and the second criterion described above may be the same criterion.

3-3. Switching Estimation Method

Next, switching of the estimation method will be described.

The information processing device switches an estimation method for estimating the relative position or the relative attitude of the aerial vehicle 30 with respect to the moving body 40 based on information related to the distance between the moving body 40 and the aerial vehicle 30.

For example, in a case where it is estimated that the aerial vehicle 30 has shifts to a state not satisfying the first criterion regarding the closeness in distance to the moving body 40, the information processing device switches the estimation method from the first estimation method to the second estimation method different from the first estimation method.

Furthermore, in a case where it is estimated that the aerial vehicle 30 is shifted to a state satisfying the second criterion regarding the closeness in distance to the moving body 40, the information processing device switches the estimation method from the second estimation method to the first estimation method (or a third estimation method, which is neither the first estimation method nor the second estimation method).

The first criterion and the second criterion may be the same criterion (for example, the same distance) or may be different criteria (for example, different distances).

3-3-1. Estimation Method

Figure 12:
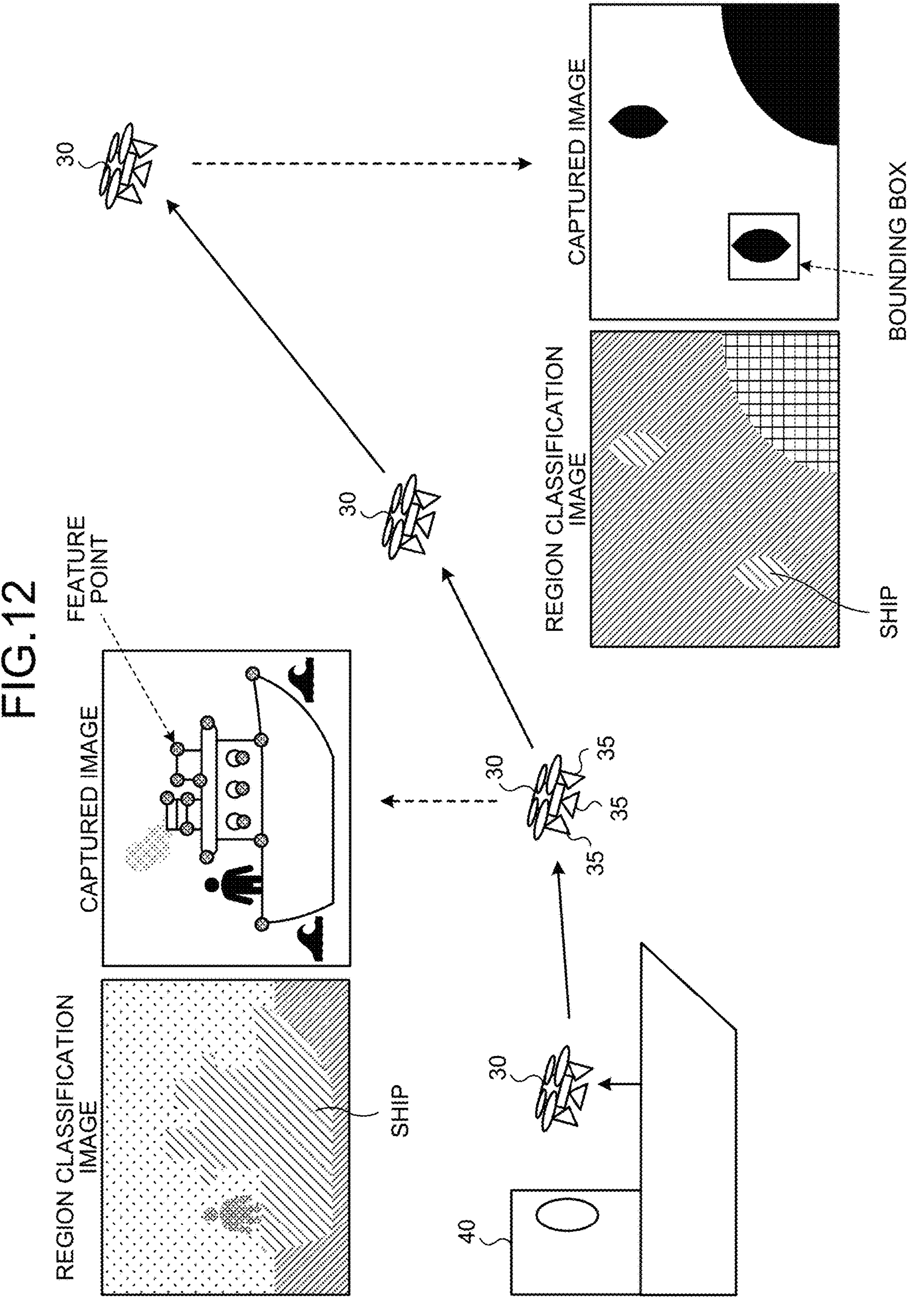
FIG. 12 is a diagram illustrating a first estimation method and a second estimation method.

FIG. 12 is a diagram illustrating the first estimation method and the second estimation method. The first estimation method is an estimation method for a short distance, and the second estimation method is an estimation method for a long distance.

First Estimation Method

For example, in a case where the distance between the moving body 40 and the aerial vehicle 30 is shorter than a predetermined distance (for example, a first distance or a second distance), the information processing device estimates the relative position and the relative attitude of the aerial vehicle 30 with respect to the moving body 40 based on the information of the region of the moving body 40 in the image. For example, the information processing device detects feature points from a region of the moving body 40 in the captured image. The feature points illustrated in the upper captured image of FIG. 12 are a result of the feature point detection. Subsequently, the information processing device checks the matching between the feature point detection result with the past feature point detection result to estimate the relative position and the relative attitude of the aerial vehicle 30 with respect to the moving body 40.

Incidentally, when the communication with the mother ship is possible, the information processing device can also estimate the relative position and the relative attitude of the aerial vehicle 30 with respect to the moving body 40 by obtaining the positions of the moving body 40 and the aerial vehicle 30 individually using a sensor such as a GNSS sensor and calculating a difference between the positions. However, since it is considered that the estimation accuracy is insufficient in the estimation performed using a sensor such as a GNSS sensor, the information processing device desirably estimates the relative position and the relative attitude of the aerial vehicle 30 using the vision information at a short distance.

Second Estimation Method

For example, in a case where the distance between the moving body 40 and the aerial vehicle 30 is longer than a predetermined distance (for example, the first distance or the second distance), the region of the moving body 40 in the captured image becomes small, making it difficult to detect feature points in the region of the moving body 40. To handle this, the information processing device tracks the moving body 40 by detecting the moving body 40 appearing in the captured image using object detection. For example, the information processing device performs tracking of the moving body 40 using a bounding box as illustrated in the captured image on the lower side of FIG. 12. Incidentally, the information processing device may use instance segmentation for tracking the moving body 40.

Note that the information processing device can also perform tracking of the moving body 40 using an image captured by the imaging unit 35 (for example, a surround-view sensing camera) disposed around the entire periphery of the aerial vehicle 30 or the imaging unit 35 (for example, an FPV camera having a gimbal mechanism) capable of changing the imaging direction.

Supplementary Notes on Estimation Method

Note that the first estimation method and the second estimation method can also be configured as follows.

For example, the first estimation method may be a method of estimating the relative position or the relative attitude of the aerial vehicle 30 based on a coordinate system relative to the home point on the moving body 40. For example, the first estimation method may be an estimation method of estimating the relative position or the relative attitude of the aerial vehicle 30 using only information of the region of the moving body 40 in the image.

The second estimation method may be a method of estimating the relative position or the relative attitude of the aerial vehicle 30 based on a stationary coordinate system (Earth coordinate system). For example, the second estimation method may be a method of estimating the relative position or the relative attitude of the aerial vehicle 30 based on the information regarding the region of the moving body 40 in the image and the information regarding the region other than the region of the moving body 40. More specifically, the second estimation method may be a method of estimating the relative position or the relative attitude of the aerial vehicle 30 using information of a region of a stationary structure in the image in addition to the region of the moving body 40 in the image. Furthermore, the second estimation method may be a method of estimating the relative position or the relative attitude of the aerial vehicle 30 based on information detected by the GNSS sensor.

It is also allowable to have a configuration in which the information processing device will not use a region (for example, the region of the water surface) that is assumed to reduce estimation accuracy when estimating the relative position or the relative attitude of the aerial vehicle 30 using the second estimation method. For example, it is assumed that the moving body 40 is a ship that moves on water. In this case, the information processing device may estimate the relative position or the relative attitude of the aerial vehicle 30 based on the information regarding the region of the moving body 40 in the image and the information regarding the region which is a region other than the region of the moving body 40 in the image and which is a region excluding the water surface and moving objects other than the moving body.

Note that the classification of the captured images may be performed by the image classification unit 132 of the server 10, may be performed by the image classification unit 232 of the terminal device 20, may be performed by the image classification unit 332 of the aerial vehicle 30, or may be performed by the image classification unit 432 of the moving body 40. For example, the image classification unit 132, 232, 332, or 432 may classify an image captured by the aerial vehicle 30 into a plurality of regions by semantic segmentation or instance segmentation.

Furthermore, the estimation of the relative position or the relative attitude of the aerial vehicle 30 may be performed by the estimation unit 133 of the server 10, may be performed by the estimation unit 233 of the terminal device 20, may be performed by the estimation unit 333 of the aerial vehicle 30, or may be performed by the estimation unit 433 of the moving body 40. For example, the estimation unit 133, 233, 333, or 433 may estimate the relative position or the relative attitude of the aerial vehicle 30 using the first estimation method or the second estimation method.

3-3-2. Switching Method

The information processing device switches the estimation method (for example, between the first estimation method and the second estimation method) based on information related to the distance between the moving body 40 and the aerial vehicle 30. Assumable switching methods include the following three switching methods (a first switching method to a third switching method). The switching method that can be adopted by the information processing device is not limited to the following three methods.

First Switching Method

Figure 13:
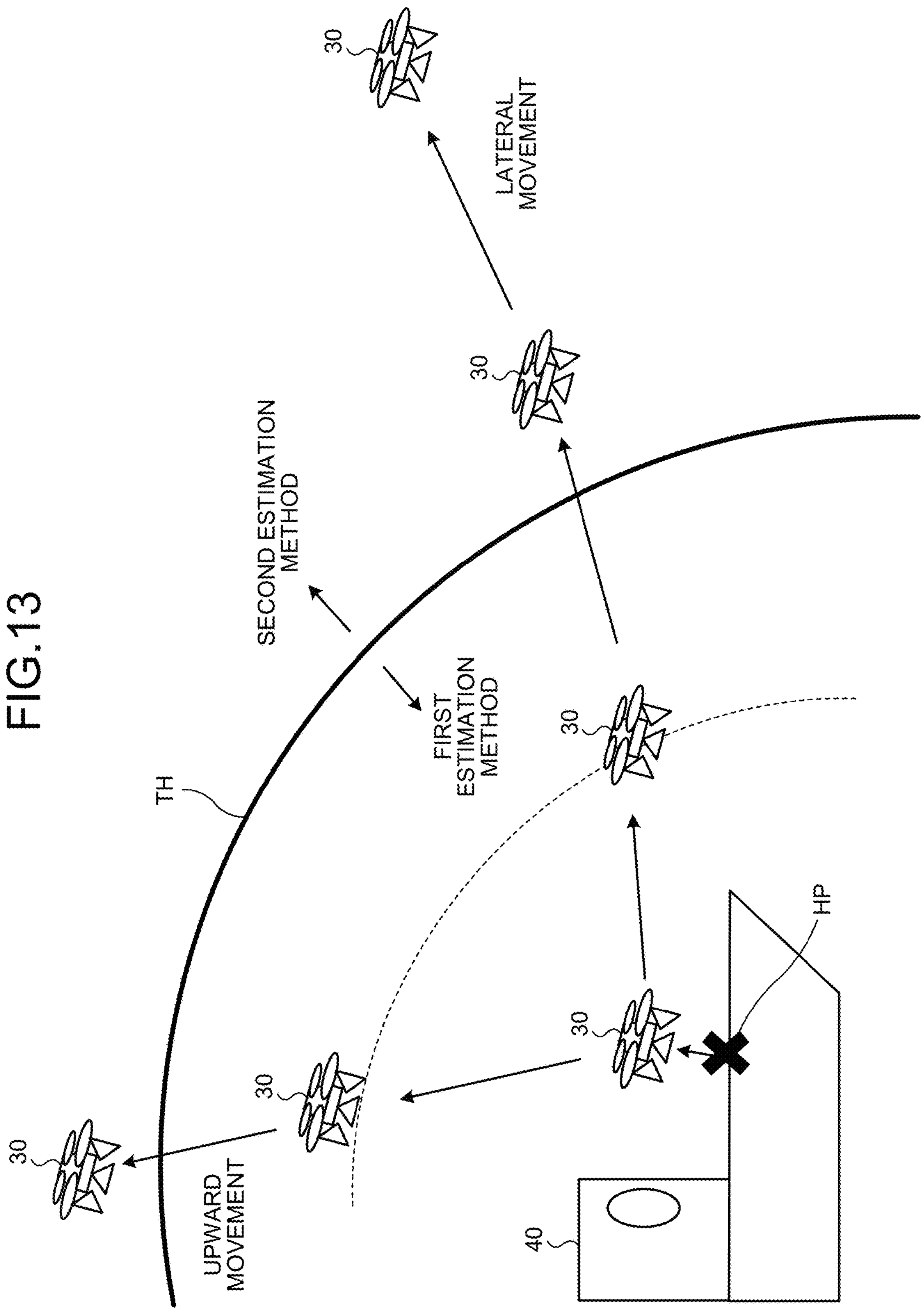
FIG. 13 is a diagram illustrating a first switching method.

FIG. 13 is a diagram illustrating the first switching method. In the example of FIG. 13, the information processing device switches the estimation method from the first estimation method to the second estimation method in a case where the distance between the moving body 40 and the aerial vehicle 30 is longer than a distance TH. The information processing device switches the estimation method from the second estimation method to the first estimation method in a case where the distance between the moving body 40 and the aerial vehicle 30 becomes shorter than the distance TH.

The information processing device may acquire information from a sensor (for example, a GNSS sensor, an IMU, or an acceleration sensor) mounted on the aerial vehicle 30 as the information related to the distance. The information processing device may estimate the distance between the moving body 40 and the aerial vehicle 30 based on the information from the sensor, and may switch the estimation method from the first estimation method to the second estimation method in a case where the estimated distance is longer than the distance TH. In addition, the information processing device may switch the estimation method from the second estimation method to the first estimation method when the estimated distance is shorter than the distance TH.

Furthermore, in a case where the moving body 40 is a moving body that moves on water or land (such as a ship and a truck, for example), the information processing device may acquire altitude information of the aerial vehicle 30 as the information related to the distance. The altitude information may be information estimated from a barometer included in the aerial vehicle 30, or may be information measured by an altimeter included in the aerial vehicle 30. In a case where the altitude of the aerial vehicle 30 becomes higher than a predetermined altitude, the information processing device may switch the estimation method from the first estimation method to the second estimation method on the determination that the distance between the moving body 40 and the aerial vehicle 30 becomes longer than the distance TH. Furthermore, in a case where the altitude of the aerial vehicle 30 becomes lower than the predetermined altitude, the information processing device may switch the estimation method from the second estimation method to the first estimation method on the determination that the distance between the moving body 40 and the aerial vehicle 30 becomes shorter than the distance TH.

Second Switching Method

Figure 14A:
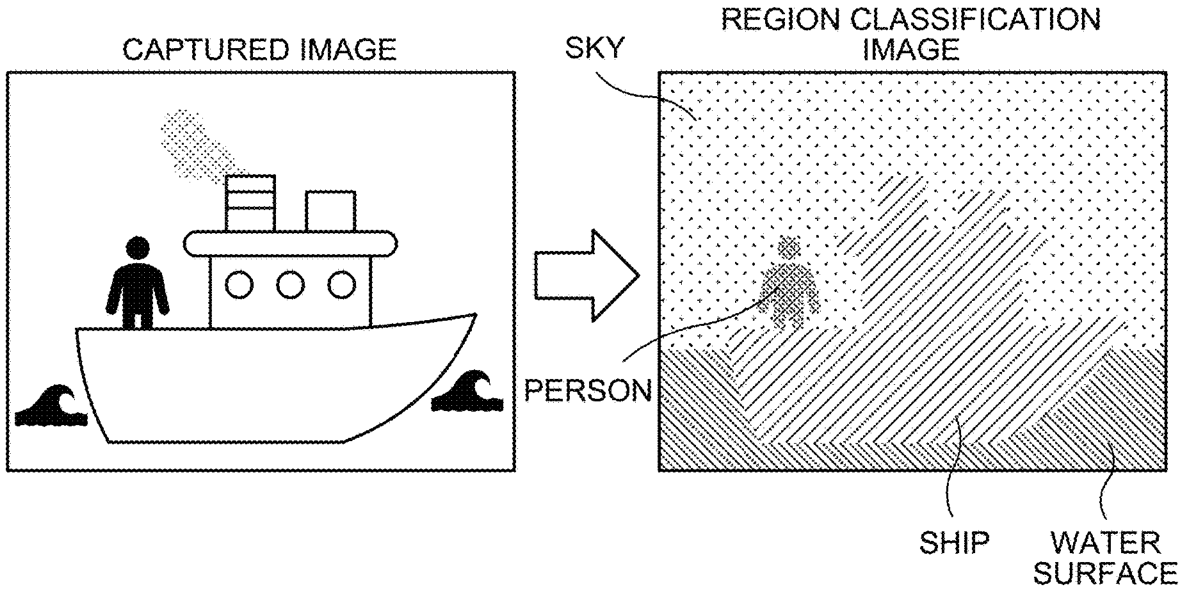
FIG. 14A is a diagram illustrating a second switching method.
Figure 14B:
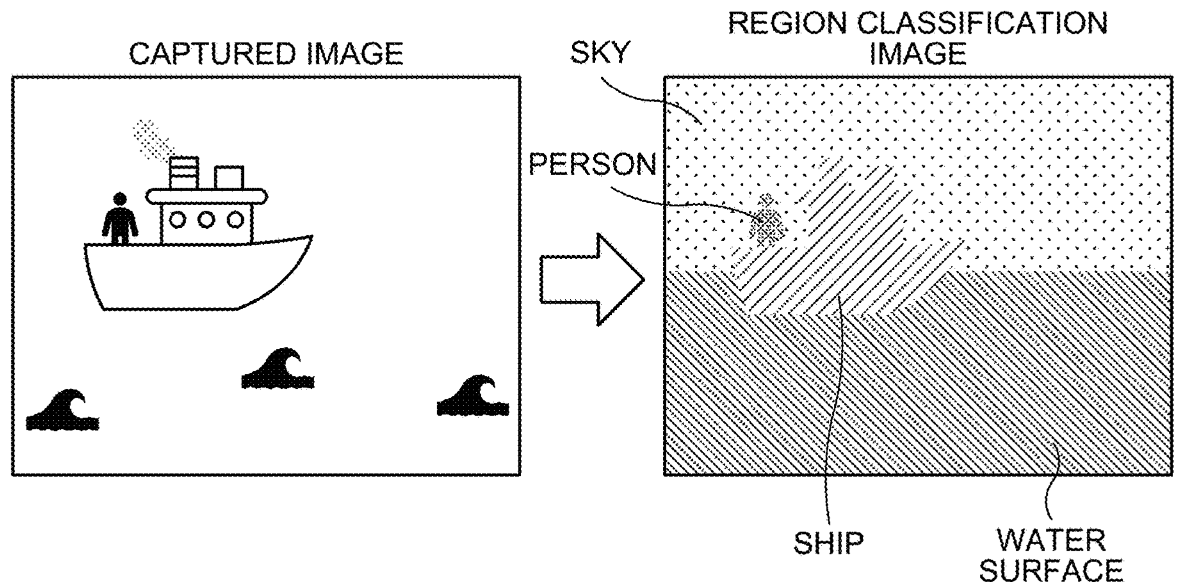
FIG. 14B is a diagram illustrating the second switching method.

FIGS. 14A and 14B are diagrams illustrating the second switching method. In the second switching method, the information processing device acquires, as the information related to the distance, information that enables determination of the region of the moving body 40 occupied in the image captured by the aerial vehicle 30. For example, as the information related to the distance, the information processing device acquires a region classification image obtained by classifying a captured image by an image classification technology (for example, semantic segmentation). Subsequently, based on the region classification image, the information processing device determines the ratio of the region of the moving body 40 with respect to the captured image. In the example of FIGS. 14A and 14B, the moving body 40 is a ship.

For example, as illustrated in FIG. 14A, the information processing device sets the estimation method to the first estimation method while the ratio of the region of the moving body 40 in the captured image is larger than a predetermined ratio. Thereafter, for example, as illustrated in FIG. 14B, in a case where the ratio of the region of the moving body 40 in the captured image is smaller than the predetermined ratio, the information processing device switches the estimation method from the first estimation method to the second estimation method on the determination that the distance between the moving body 40 and the aerial vehicle 30 is longer than the predetermined distance. Thereafter, for example, as illustrated in FIG. 14A, in a case where the ratio of the region of the moving body 40 in the captured image becomes smaller than the predetermined ratio, the information processing device switches the estimation method from the second estimation method to the first estimation method on the determination that the distance between the moving body 40 and the aerial vehicle 30 is shorter than the predetermined distance.

Third Switching Method

Figures 15A, 15B:
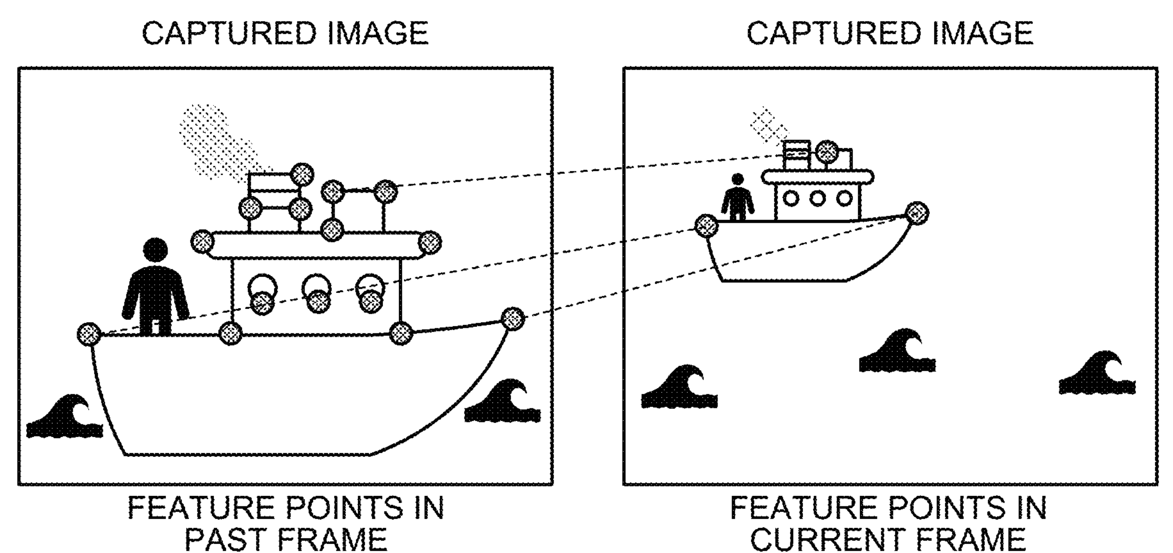
FIG. 15A is a diagram illustrating a third switching method.
FIG. 15B is a diagram illustrating a third switching method.

FIGS. 15A and 15B are diagrams illustrating the third switching method. In the third switching method, the information processing device acquires information regarding feature points of the moving body 40 detected from an image captured by the aerial vehicle 30 as the information related to the distance. Subsequently, the information processing device checks the matching between the feature points detected in the image at the predetermined time point in the past with the feature points detected in the image at the current time point. In the example of FIGS. 15A and 15B, the moving body 40 is a ship.

As a result of the matching check, for example, as illustrated in FIG. 15A, the information processing device sets the estimation method as the first estimation method while the number of matched feature points is larger than a predetermined number. Thereafter, for example, as illustrated in FIG. 15B, in a case where the number of matched feature points is smaller than the predetermined number, the information processing device switches the estimation method from the first estimation method to the second estimation method on the determination that the distance between the moving body 40 and the aerial vehicle 30 is longer than a predetermined distance. Thereafter, for example, as illustrated in FIG. 15A, in a case where the number of matched feature points is smaller than the predetermined number, the information processing device switches the estimation method from the first estimation method to the second estimation method on the assumption that the distance between the moving body 40 and the aerial vehicle 30 is shorter than the predetermined distance.

Supplementary Notes Related to Switching Method

The acquisition of the information related to the distance may be performed by the acquisition unit 131 of the server 10, may be performed by the acquisition unit 231 of the terminal device 20, may be performed by the acquisition unit 331 of the aerial vehicle 30, or may be performed by the acquisition unit 431 of the moving body 40. In addition, the switching of the estimation method may be performed by the switching unit 134 of the server 10, may be performed by the switching unit 234 of the terminal device 20, may be performed by the switching unit 334 of the aerial vehicle 30, or may be performed by the switching unit 434 of the moving body 40.

3-4. Take-Off and Landing Control

Next, take-off and landing control of the aerial vehicle 30 will be described.

Figure 16:
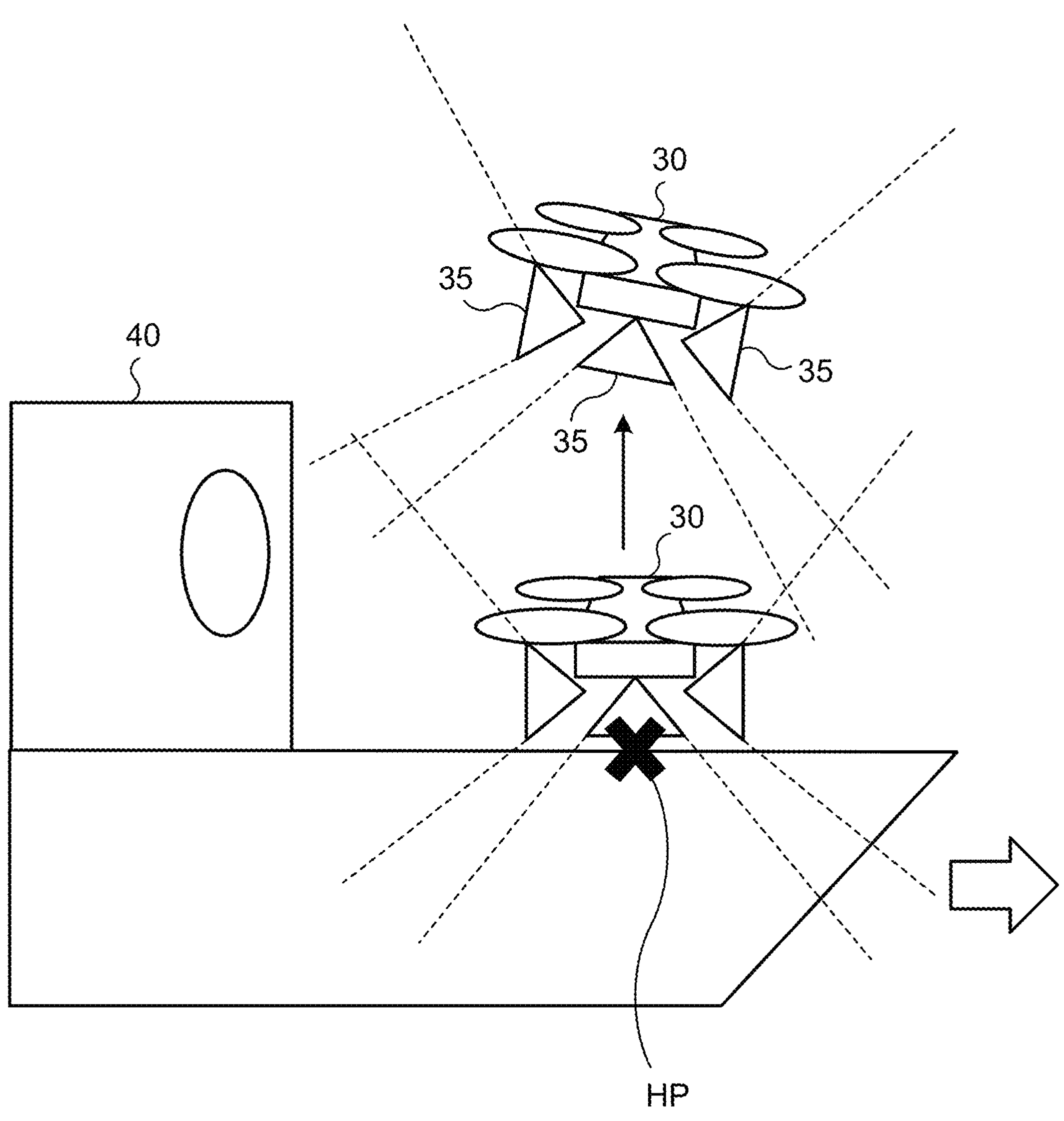
FIG. 16 is a diagram illustrating take-off control of an aerial vehicle.

The information processing device controls the flight of the aerial vehicle 30 at the time of take-off and landing so as to cancel the movement of the moving body 40. More specifically, the information processing device controls the flight of the aerial vehicle 30 as follows. FIG. 16 is a diagram illustrating take-off control of the aerial vehicle 30.

First, after the power of the aerial vehicle 30 is turned on, the information processing device acquires detection results (hereinafter, it is referred to as sensor information) from the sensor unit 34 (for example, GNSS sensor, barometer, IMU) of the aerial vehicle 30 while maintaining the landing state of the aerial vehicle 30 on the moving body 40. Note that the information processing device may acquire the sensor information from the sensor unit 44 of the moving body 40. Subsequently, the information processing device estimates a motion (moving direction and speed) of the moving body 40 based on the sensor information.

Thereafter, the information processing device causes the aerial vehicle 30 to take off from the moving body 40. For example, the information processing device controls the aerial vehicle 30 to gradually move upward from the home position HP to a predetermined altitude. At this time, the information processing device controls the movement of the aerial vehicle 30 in the horizontal direction such that the moving direction and the speed of the aerial vehicle 30 in the horizontal direction matches the moving direction and the speed of the moving body 40 estimated in advance. With this control, the aerial vehicle 30 appears to be hovering when viewed from a person on the moving body 40.

Note that, in a case where the moving body 40 is a moving body moving on water, such as a ship, it is assumed that the moving body 40 vibrates up and down due to the influence of waves. Therefore, in a case where the moving body 40 is a moving body moving on water, the information processing device may perform flight control of the aerial vehicle 30 based on the information regarding the movement of the moving body 40 in the horizontal direction (information regarding the transition direction and the speed in the water direction) without using the information regarding the movement of the moving body 40 in an up-down direction.

When the aerial vehicle 30 reaches the target altitude, the information processing device estimates the relative position and the relative attitude of the aerial vehicle 30 with respect to the moving body 40 based on vision information obtained from the aerial vehicle 30. The information processing device then performs flight control of the aerial vehicle 30 so as to cancel the movement of the moving body 40 based on the information regarding the relative position and the relative attitude of the aerial vehicle 30. This makes it possible for the aerial vehicle 30 to perform take-off from the moving body 40 without colliding with the moving body 40.

At the time of landing, the information processing device estimates the relative position and the relative attitude of the aerial vehicle 30 with respect to the moving body 40 based on the vision information obtained from the aerial vehicle 30, and performs flight control of the aerial vehicle 30 so as to cancel the movement of the moving body 40. This makes it possible for the aerial vehicle 30 to perform landing on the moving body 40 without colliding with the moving body 40.

The acquisition of the sensor information may be performed by the acquisition unit 131 of the server 10, may be performed by the acquisition unit 231 of the terminal device 20, may be performed by the acquisition unit 331 of the aerial vehicle 30, or may be performed by the acquisition unit 431 of the moving body 40. The flight control of the aerial vehicle 30 may be performed by the flight control unit 136 of the server 10, may be performed by the flight control unit 236 of the terminal device 20, may be performed by the flight control unit 336 of the aerial vehicle 30, or may be performed by the flight control unit 436 of the moving body 40.

3-5. Automatic Return Control

Next, automatic return control of the aerial vehicle 30 will be described.

When an activation condition of the RTH is satisfied (for example, when the aerial vehicle 30 is separated from the home position HP by a predetermined distance), the information processing device controls the aerial vehicle 30 to return to the home position HP. Here, the information processing device may retain information related to a path which is in a coordinate system relative to the moving body and which is a path at the departure of the aerial vehicle 30 from the moving body 40, and may control the flight of the aerial vehicle 30 at the time of return so as to follow the reverse of the path used at the time of departure. Hereinafter, the automatic return control of the aerial vehicle 30 will be described in detail with reference to the drawings.

Figure 17:
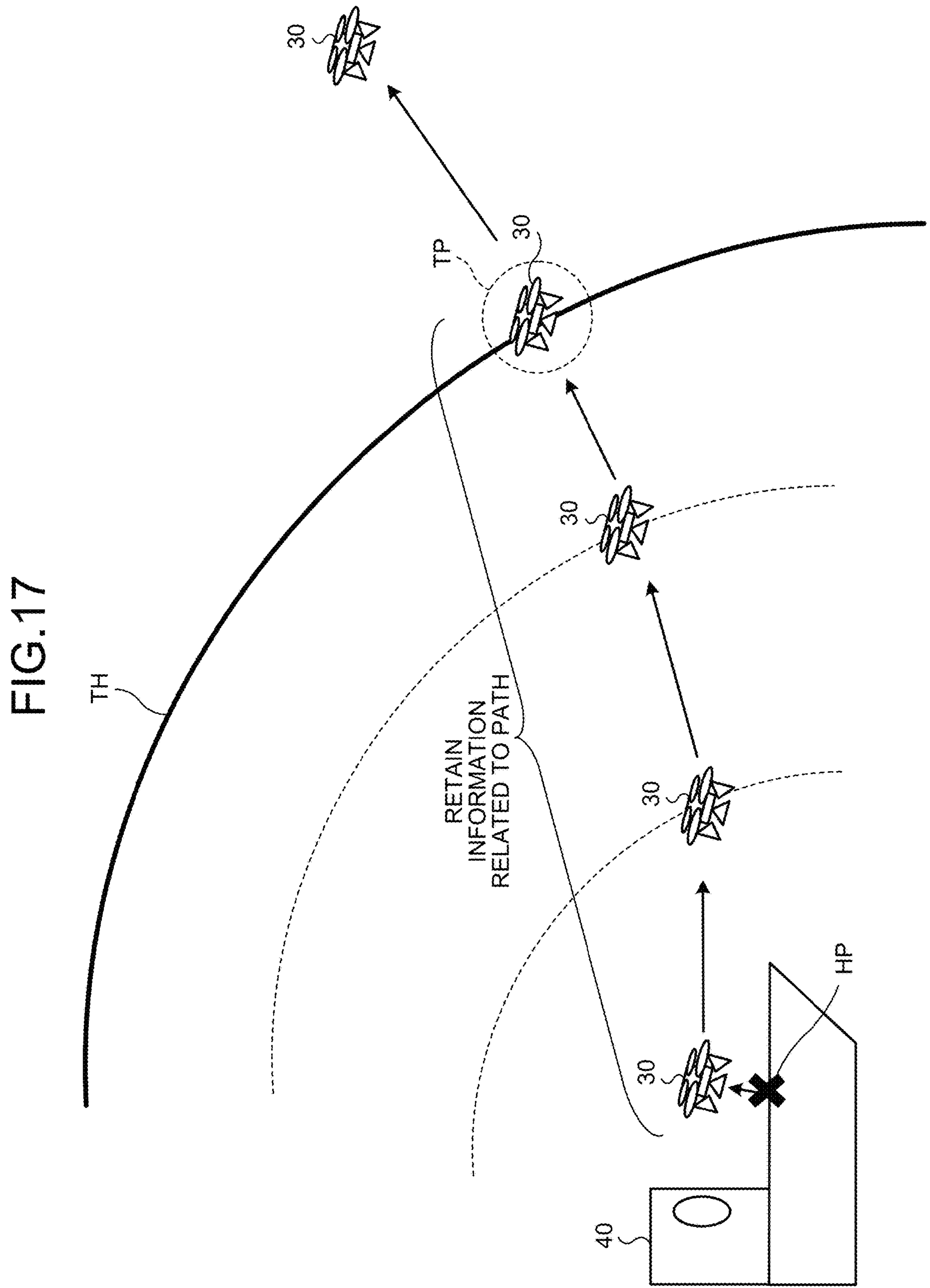
FIG. 17 is a diagram illustrating a state of departure of the aerial vehicle from the moving body.

FIG. 17 is a diagram illustrating a state of departure of the aerial vehicle 30 from the moving body 40. For example, at the departure of the aerial vehicle 30 from the moving body 40, the information processing device holds information related to a path for the time of departure at regular distance intervals. The information processing device may hold the information related to the path when there is a large change in the number of feature points after matching with the past frame. The information processing device continues retention of the information related to the path until the time point the estimation method is switched. In the example of FIG. 17, the information processing device continues retention of the information related to the path until the aerial vehicle 30 is shifted to a state not satisfying the first criterion (until the aerial vehicle 30 reaches the target point TP). That is, the information related to the path is continuously retained until the aerial vehicle 30 reaches the distance TH. Here, the distance TH may be a limit of the distance within which the first estimation method can be applied.

Note that the information related to the path may be an image (hereinafter, it is also referred to as a key frame.) itself obtained by imaging the moving body 40 from the aerial vehicle 30. When the aerial vehicle 30 includes a plurality of cameras, the information related to the path may include captured images of the moving body 40 from all viewpoints. Furthermore, the information related to the path may be information related to feature points in the region of the moving body 40 from all viewpoints, and information related to the relative position, the relative attitude, and the absolute altitude of the aerial vehicle 30 at that time.

Figure 18:
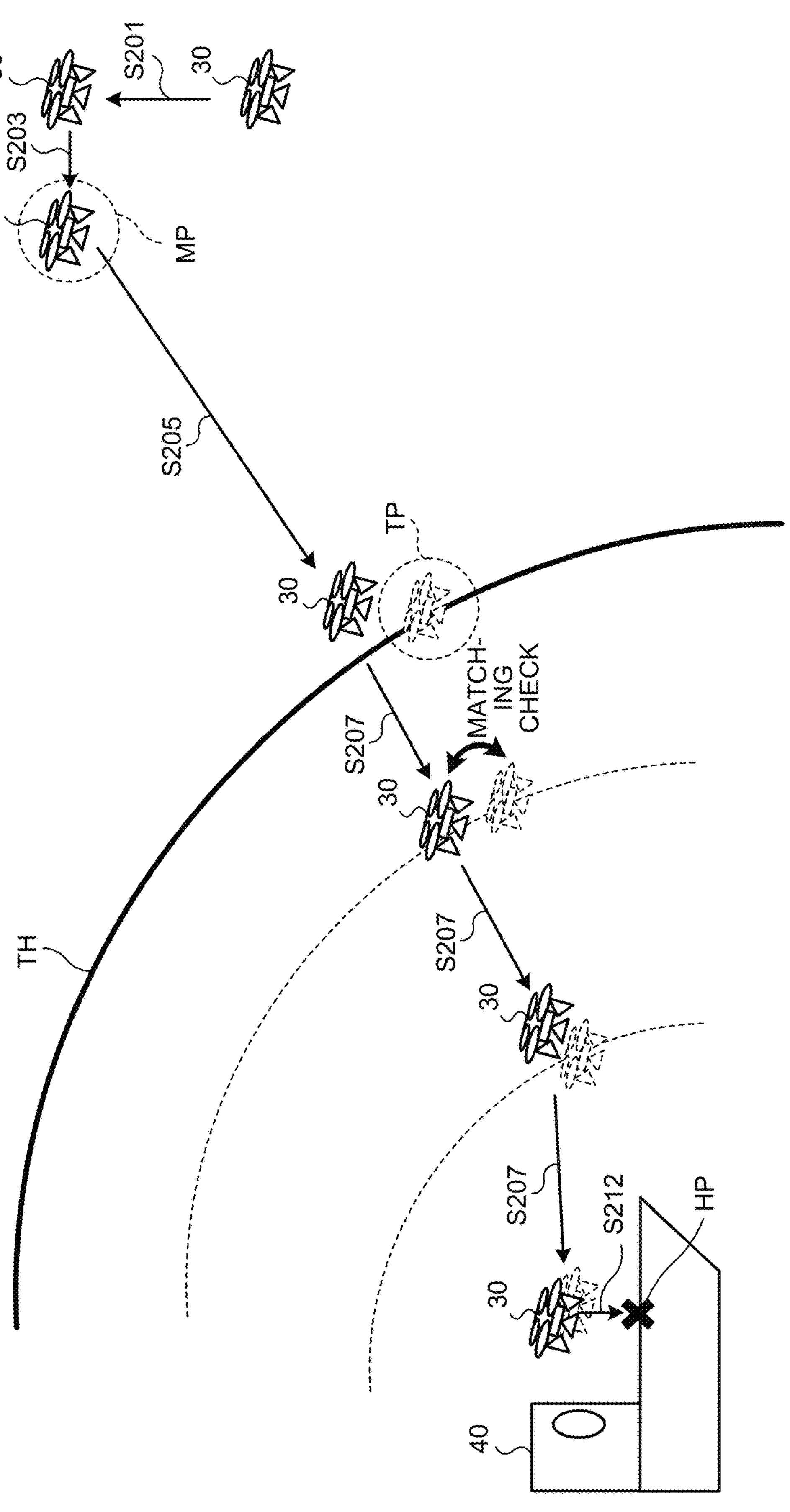
FIG. 18 is a diagram illustrating a state of return of the aerial vehicle to the moving body.

After the free flight of the aerial vehicle 30, when the activation condition of the RTH is satisfied, the information processing device controls the aerial vehicle 30 to return to the moving body 40. FIG. 18 is a diagram illustrating a state of return of the aerial vehicle 30 to the moving body 40.

When the RTH is activated, the information processing device increases the altitude of the aerial vehicle 30 to a predetermined altitude. Subsequently, while maintaining the altitude of the aerial vehicle 30 at a predetermined altitude, the information processing device controls the aerial vehicle 30 to move to a position where a directional vector to the moving body 40 becomes the same as the directional vector at the time of retention of the information related to the path at the target point TP.

Figure 19A:
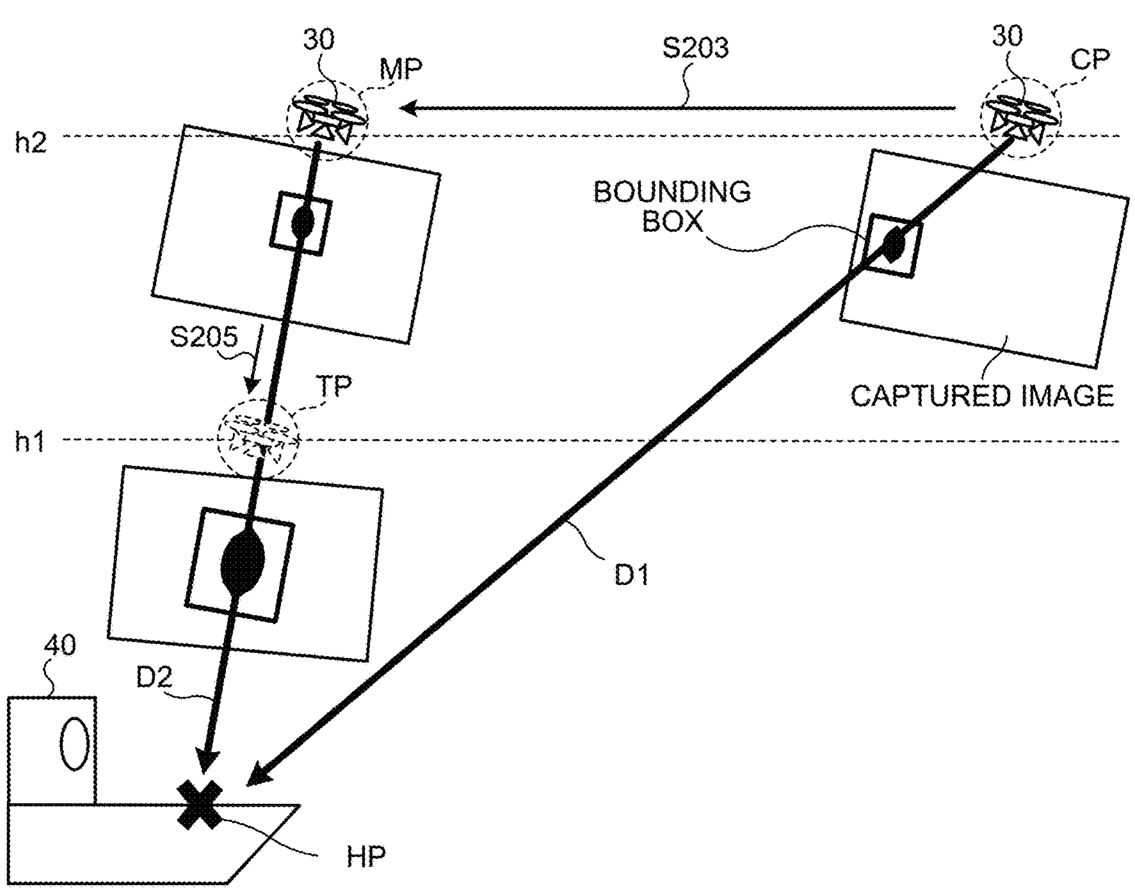
FIG. 19A is a diagram illustrating automatic return control of an aerial vehicle.
Figure 19B:
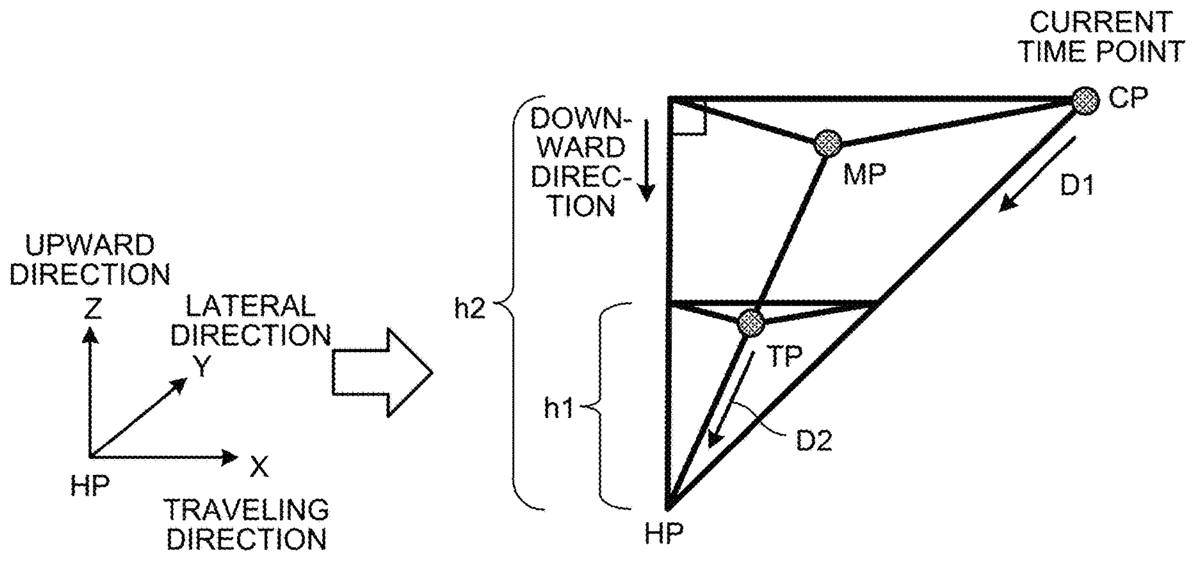
FIG. 19B is a diagram illustrating automatic return control of an aerial vehicle.

At this time, the information processing device may control the aerial vehicle 30 based on a bounding box in the captured image. This control will be described in detail with reference to FIGS. 19A and 19B. FIGS. 19A and 19B are diagrams illustrating automatic return control of the aerial vehicle 30. In the examples of FIGS. 19A and 19B, the aerial vehicle 30 is currently in a state of having gained altitude to a predetermined altitude (an altitude h2 illustrated in FIG. 19A). In the examples of FIGS. 19A and 19B, the current position of the aerial vehicle 30 is at a current point CP.

The aerial vehicle 30 tracks the moving body 40 in the captured image with a bounding box, and the current direction of the moving body 40 determined from the bounding box is indicated by a directional vector D1 as illustrated in FIG. 19A. On the other hand, the direction of the moving body 40 at the target point TP at the departure of the aerial vehicle 30 from the moving body 40 is indicated by a directional vector D2 as illustrated in FIGS. 19A and 19B. At this time, the information processing device may determine the directional vector D2 based on the information related to the path retained at the target point TP at the time of departure of the aerial vehicle 30 from the moving body 40. The information processing device controls the aerial vehicle 30 to move to a position (an intermediate target MP illustrated in FIGS. 19A and 19B) where the directional vector of the aerial vehicle 30 toward the moving body 40 becomes the directional vector D2 while maintaining the altitude of aerial vehicle 30 at the altitude h2.

Subsequently, the information processing device controls the aerial vehicle 30 to gradually descend until the altitude of the aerial vehicle 30 reaches an altitude h1 of the target point TP while maintaining the directional vector of the aerial vehicle 30 toward the moving body 40 at the directional vector D2. Under this control, the aerial vehicle 30 reaches the target point TP.

Returning to FIG. 18, the information processing device controls the flight of the aerial vehicle 30 so that the aerial vehicle 30 reversely follows the path at the time of take-off while maintaining a constant relative speed of the aerial vehicle 30 with the moving body 40. At this time, the information processing device may control the flight of the aerial vehicle 30 based on the information of the region of the moving body 40 in the captured image. For example, the information processing device may control the flight of the aerial vehicle 30 so as to obtain a match in the matching check between the information regarding the region of the moving body 40 in the image captured by the aerial vehicle 30 and the region of the moving body 40 in the key frame retained at the time of departure. At this time, the information of the region of the moving body 40 may be information of a feature point.

When the aerial vehicle 30 has moved to a position above the home position HP, the information processing device causes the aerial vehicle 30 to land at the home position HP. The information processing device controls the aerial vehicle 30 to descend while allowing the aerial vehicle 30 to move in horizontal translation so as to maintain a constant horizontal relative position with respect to the moving body 40. This makes it possible for the aerial vehicle 30 to return to the moving body 40 without colliding with the moving body 40.

Retention of the information related to the path may be performed by the path retention unit 135 of the server 10, performed by the path retention unit 235 of the terminal device 20, performed by the path retention unit 335 of the aerial vehicle 30, or performed by the path retention unit 435 of the moving body 40. The flight control of the aerial vehicle 30 may be performed by the flight control unit 136 of the server 10, may be performed by the flight control unit 236 of the terminal device 20, may be performed by the flight control unit 336 of the aerial vehicle 30, or may be performed by the flight control unit 436 of the moving body 40.

3-6. Supplementary Notes

Note that the information processing device may estimate the relative position and the relative attitude of the aerial vehicle 30 with respect to the moving body 40 by using an estimation method different from the above.

When a 3D model (or a high-precision map) of the moving body 40 and surroundings of the moving body 40 has been obtained as a preliminary map, the information processing device may estimate the relative position and the relative attitude of the aerial vehicle 30 with respect to the moving body 40 by performing point group matching such as an Iterative Closest Point (ICP) method between the high precision map (or the high-precision map) and depth information sensed using the depth sensor. Note that the 3D models around the moving body 40 and the moving body 40 may be generated on the spot by the aerial vehicle 30 during take-off.

Furthermore, when a 3D model (or a high-precision map) of the moving body 40 and the surroundings of the moving body 40 has been obtained as the preliminary map, the information processing device may control the aerial vehicle 30 to return to the home point by check the matching between the current captured image of the aerial vehicle 30 and the preliminary map.

4. Processing Example

The operation of the aerial vehicle control system 1 has been described above. Next, some examples of processing executed by the aerial vehicle control system 1 will be described. Before describing processing executed by the aerial vehicle control system 1, a functional configuration of the aerial vehicle control system will be described.

4-1. Functional Configuration of Aerial Vehicle Control System

While the above <2. Configuration of aerial vehicle control system> has described a configuration of each device constituting the aerial vehicle control system 1, the aerial vehicle control system 1 can also be configured as follows.

FIG. 20 is a diagram illustrating a functional configuration of the aerial vehicle control system 1. The aerial vehicle control system 1 includes an imaging unit 35, a moving body detection unit 501, an image classification unit 502, a feature point detection unit 503, a vision relative position estimation unit 504, a vision absolute position estimation unit 505, an IMU 506, a GNSS sensor 507, a barometer 508, a geomagnetic sensor 509, an absolute position estimation unit 510, a key frame registration unit 511, a storage unit 512, a matching check unit 513, and a flight control unit 514.

For example, the moving body detection unit 501 detects the position or the direction of the mother ship based on an image captured by the imaging unit 35. The image classification unit 502 classifies an image captured by the imaging unit 35 into a plurality of regions using an image classification technology such as semantic segmentation, for example. For example, the image classification unit 502 classifies the captured image into at least a region of the moving body 40 and a stationary region (stationary structure region). The feature point detection unit 503 extracts feature points from the captured image.

The vision relative position estimation unit 504 estimates the relative position and the relative attitude of the aerial vehicle 30 with respect to the moving body 40 based on vision information. The vision absolute position estimation unit 505 estimates the absolute position and the absolute attitude of the aerial vehicle 30 based on vision information. Here, the absolute position and the absolute attitude are the position and the attitude of the aerial vehicle 30 with reference to the stationary coordinate system (Earth coordinate system). The IMU 506, the GNSS sensor 507, the barometer 508, and the geomagnetic sensor 509 are sensors included in the aerial vehicle 30. The IMU 506, the GNSS sensor 507, the barometer 508, and the geomagnetic sensor 509 correspond to the sensor unit 34, for example. The absolute position estimation unit 510 estimates the absolute position (including altitude information) of the aerial vehicle 30 based on sensor information and the like. The vision relative position estimation unit 504, the vision absolute position estimation unit 505, and the absolute position estimation unit 510 correspond to the estimation unit 133, the estimation unit 233, the estimation unit 333, or the estimation unit 333, for example.

The key frame registration unit 511 registers, in the storage unit 512, an image (key frame) captured at the departure of the aerial vehicle 30 from the moving body 40. Note that the key frame registration unit 511 may register information extracted from the key frame (for example, a feature point extracted from a key frame) in the storage unit 512 instead of the key frame itself. The key frame registration unit 511 corresponds to the path retention unit 135, the path retention unit 235, or the path retention unit 435, for example. The storage unit 512 stores information transmitted from the key frame registration unit 511. The storage unit 512 corresponds to the storage unit 12, the storage unit 22, the storage unit 32, or the storage unit 42, for example. When the aerial vehicle 30 returns to the moving body 40, the matching check unit 513 checks the matching between the key frame and the current image captured by the aerial vehicle 30, and calculates a difference between the current position of the aerial vehicle 30 and the path at the time of departure.

The flight control unit 514 controls the flight of the aerial vehicle 30 based on information from the moving body detection unit 501, the vision relative position estimation unit 504, the absolute position estimation unit 510, and/or the matching check unit 513. The flight control unit 514 corresponds to the flight control unit 136, the flight control unit 236, the flight control unit 336, or the flight control unit 336, for example.

Note that the configuration illustrated in FIG. 20 is a functional configuration, and the hardware configuration may be different from this. Furthermore, the functions of the aerial vehicle control system 1 may be installed in a distributed manner in a plurality of physically separated configurations. For example, the moving body detection unit 501 to the flight control unit 514 may be installed in a distributed manner on a plurality of devices selected from the server 10, the terminal device 20, the aerial vehicle 30, and the moving body 40. Obviously, one device selected from the server 10, the terminal device 20, the aerial vehicle 30, and the moving body 40 may be equipped with all the functions of the moving body detection unit 501 to the flight control unit 514.

4-2. Path Retention Processing

Although the functional configuration of the aerial vehicle control system 1 has been described above, the path retention processing will be first described based on this functional configuration.

Figure 21:
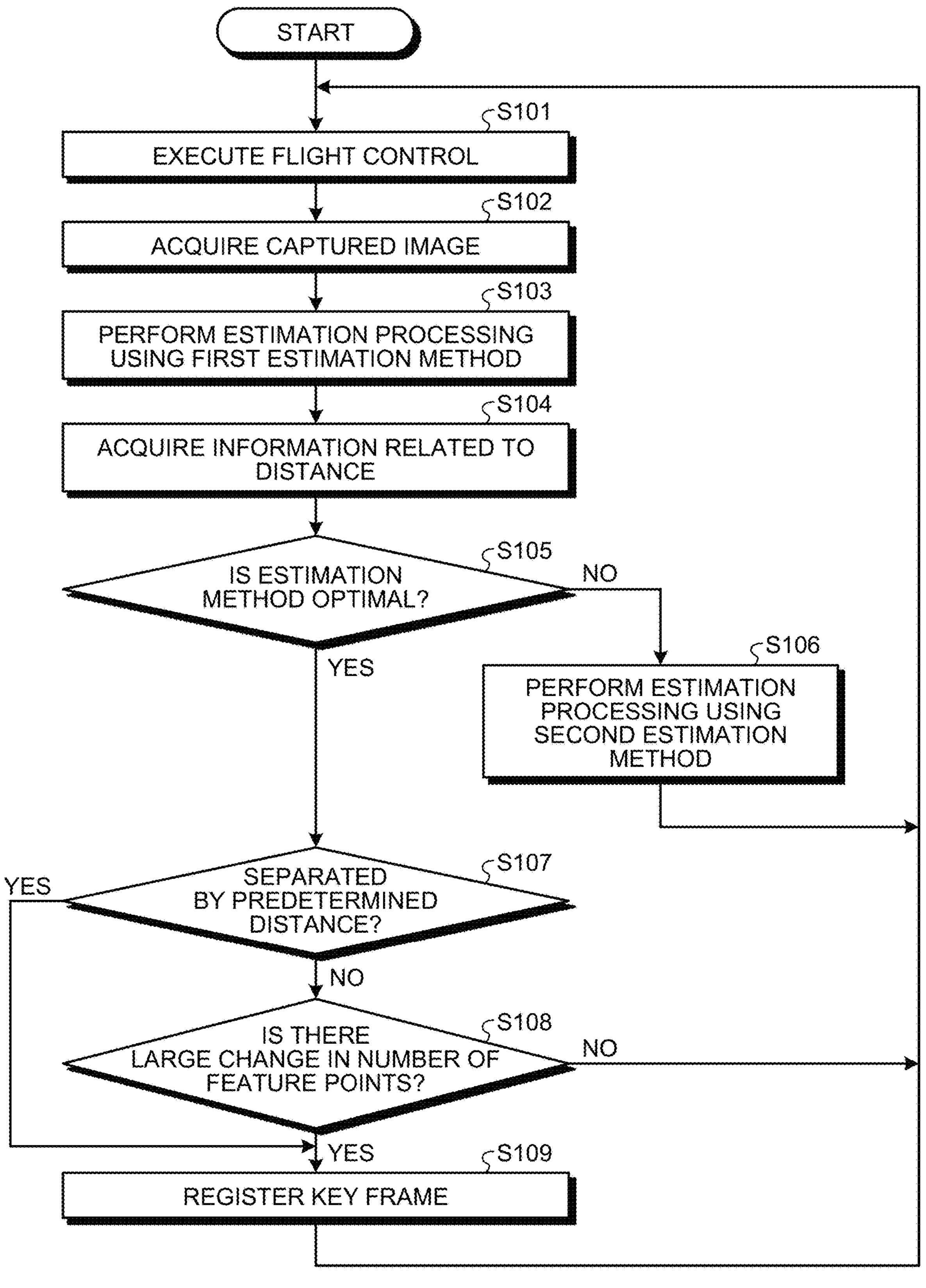
FIG. 21 is a flowchart illustrating path retention processing according to the present embodiment.

When the aerial vehicle 30 is powered on, the aerial vehicle control system 1 executes path retention processing. FIG. 21 is a flowchart illustrating path retention processing according to the present embodiment.

The following processing may be executed by a control unit of one information processing device included in the aerial vehicle control system 1, or may be executed by control units of a plurality of information processing devices included in the aerial vehicle control system 1 in cooperation with each other. Here, the information processing device may be the server 10, the terminal device 20, the aerial vehicle 30, or the moving body 40. As described above, the aerial vehicle control system 1 can also be configured as in the functional block diagram illustrated in FIG. 20. The path retention processing will be described below with reference to the flowchart of FIG. 21.

First, the information processing device executes flight control of the aerial vehicle 30 (step S101). For example, the information processing device executes take-off control of the aerial vehicle 30 in accordance with user's operation (for example, a take-off instruction using the terminal device 20). Furthermore, in a case where the information regarding the relative position and the relative attitude of the aerial vehicle 30 with respect to the moving body 40 has been acquired, the information processing device controls the flight of the aerial vehicle 30 based on the information regarding the relative position and the relative attitude.

Subsequently, the information processing device acquires an image captured by the aerial vehicle 30 (step S102). At this time, the information processing device may perform processing such as image correction and distortion removal of the captured image.

Subsequently, the information processing device executes processing of estimating the relative position and the relative attitude of the aerial vehicle 30 with respect to the moving body 40 by using the first estimation method (step S103).

Thereafter, the information processing device acquires information related to the distance between the moving body 40 and the aerial vehicle 30 (step S104). The information processing device determines whether the first estimation method is an optimal estimation method (step S105). For example, the information processing device determines whether the aerial vehicle 30 is separated from the moving body 40 by a distance TH or more illustrated in FIG. 17.

In a case where the first estimation method is not the optimal estimation method (step S105: No), for example, in a case where the distance between the aerial vehicle 30 and the moving body 40 is longer than the distance TH, the information processing device executes processing of estimating the relative position and the relative attitude of the aerial vehicle 30 with respect to the moving body 40 by using the second estimation method (step S106). When the estimation processing is completed, the information processing device goes back to the processing of step S101.

In a case where the first estimation method is the optimal estimation method (step S105: No), for example, in a case where the distance between the aerial vehicle 30 and the moving body 40 is shorter than the distance TH, the information processing device determines whether the separation distance is a predetermined distance from the time of the registration of the previous key frame (step S107). In a case where the separation distance is the predetermined distance (step S107: Yes), the information processing device proceeds to the processing of step S109.

In contrast, in a case where the separation distance is not the predetermined distance (step S107: No), the information processing device determines whether the change in the number of feature points is larger than that at the time of the previous key frame registration (step S108). For example, the information processing device determines whether a difference between the number of feature points of the region of the moving body 40 in the previous key frame and the number of feature points of the region of the moving body 40 in the current captured image is larger than a predetermined threshold. In a case where the change in the number of feature points is small (step S108: No), the information processing device goes back to the processing of step S101 without registering the key frame.

In contrast, when the change in the number of feature points is large (step S108: Yes), the information processing device registers the current captured image of the aerial vehicle 30 in the storage unit as a key frame (step S109). Note that the information to be registered does not have to be the key frame itself. For example, the information processing device may register the image feature points extracted from the key frame, the segmentation result, the relative position and the relative attitude of the aerial vehicle 30 with respect to the moving body 40, the altitude information of the aerial vehicle 30, and the information related to the bounding box, in the storage unit as the information related to the path.

When the registration is completed, the information processing device goes back to the processing of step S101.

4-3. Return Processing

First, return processing will be described.

When the RTH is activated for the aerial vehicle 30, the aerial vehicle control system 1 executes return processing. FIG. 22 is a flowchart illustrating return processing according to the present embodiment.

The following processing may be executed by a control unit of one information processing device included in the aerial vehicle control system 1, or may be executed by control units of a plurality of information processing devices included in the aerial vehicle control system 1 in cooperation with each other. Hereinafter, the return processing will be described with reference to the flowchart of FIG. 22.

First, as illustrated in FIG. 18, the information processing device increase the altitude of the aerial vehicle 30 until the aerial vehicle 30 reaches a predetermined altitude (step S201). The information processing device determines whether the aerial vehicle 30 has reached a predetermined altitude (step S202). When the altitude has not reached the predetermined altitude (step S202: No), the information processing device repeats the execution of step S201 until the aerial vehicle 30 reaches the predetermined altitude.

When the aerial vehicle 30 reaches the predetermined altitude (step S202: Yes), the aerial vehicle 30 is horizontally translated until the aerial vehicle 30 reaches an intermediate target MP illustrated in FIG. 18 (step S203). The information processing device determines whether the aerial vehicle 30 has reached the intermediate target MP (step S204). When the intermediate target MP has not been reached (step S204: No), the information processing device repeats the execution of step S203 until the aerial vehicle 30 reaches the intermediate target MP.

When the aerial vehicle 30 has reached the intermediate target MP (step S204: Yes), the aerial vehicle 30 is moved until the aerial vehicle 30 reaches the target point TP illustrated in FIG. 18 (step S205). The information processing device determines whether the aerial vehicle 30 has reached the target point TP (step S206). When the target point TP has not been reached (step S206: No), the information processing device repeats the execution of step S205 until the aerial vehicle 30 reaches the target point TP.

When the aerial vehicle 30 has reached the target point TP (step S206: Yes), the information processing device controls the flight of the aerial vehicle 30 based on the key frame retained in the path retention processing (step S207). At this time, the information processing device checks the matching between the image captured by the aerial vehicle 30 and the key frame (step S208). Subsequently, it is determined whether the relative position of the aerial vehicle 30 determined as a result of the matching check is within a predetermined distance from the relative position determined by the key frame (step S209). In a case where the distance is not within the predetermined distance (step S209: No), the information processing device goes back to the processing of step S207.

When the distance is not within the predetermined distance (step S209: No), the information processing device determines whether a next target key frame is registered in the storage unit (step S210). In a case where there is a next target key frame (step S210: Yes), the information processing device changes the target key frame to the next target key frame (step S211), and goes back to the processing of step S207.

When there is no next target key frame (step S210: No), the information processing device performs landing control of the aerial vehicle 30 onto the home point HP (step S212). When the landing is completed, the information processing device ends the return processing.

5. Modification

The above-described embodiment is an example, and various modifications and applications are possible.

5-1. Modification Using Radio and GNSS Sensor

In the above-described embodiment, the information processing device estimates the relative position and the relative attitude of the aerial vehicle 30 with respect to the moving body 40 based on the vision information. Alternatively, the information processing device may estimate the relative position and the relative attitude of the aerial vehicle 30 using radio or a GNSS sensor.

In this case, the functional configuration of the aerial vehicle control system 1 illustrated in FIG. 20 can be modified as illustrated in FIG. 23. FIG. 23 is a diagram illustrating another example of the functional configuration of an aerial vehicle control system 1. The moving body detection unit 501 is eliminated, and a communication unit 601 and a relative position estimation unit 602 are newly provided.

The communication unit 601 wirelessly receives information regarding the absolute position and the absolute attitude of the moving body 40 detected by the sensor unit 44 of the moving body 40 (or the sensor unit 24 of the terminal device 20) from the moving body 40 (or the terminal device 20). Here, the absolute position and the absolute attitude are the position and the attitude of the moving body 40 with respect to the stationary coordinate system (Earth coordinate system). Subsequently, the communication unit 601 transmits information regarding the absolute position of the moving body 40 to the relative position estimation unit 602. The communication unit 601 corresponds to the communication unit 11, the communication unit 21, the communication unit 31, or the communication unit 41, for example.

The relative position estimation unit 602 estimates the relative position and the relative attitude of the aerial vehicle 30 with respect to the moving body 40 based on the information regarding the absolute position and the absolute attitude of the moving body 40 and the information regarding the absolute position and the absolute attitude of the aerial vehicle 30. The relative position estimation unit 602 corresponds to the estimation unit 133, the estimation unit 233, the estimation unit 333, or the estimation unit 333, for example.

When estimating the relative position and the relative attitude of the aerial vehicle 30 using radio or a GNSS sensor, the automatic return control of the aerial vehicle 30 described above can be configured as follows.

For example, when the activation condition of the RTH is satisfied, the information processing device increases the altitude of the aerial vehicle 30 to a predetermined altitude. Subsequently, while maintaining the altitude of the aerial vehicle 30 at a predetermined altitude, the information processing device controls the aerial vehicle 30 to move to a point (intermediate target MP illustrated in FIG. 18) where a directional vector to the moving body 40 becomes the same as the directional vector at the time of retention of the information related to the path at the target point TP. The information processing device then controls the aerial vehicle 30 to gradually descend toward the target point TP.

At this time, the aerial vehicle 30 and the moving body 40 estimate their own absolute positions based on information from sensors such as a GNSS sensor and a barometer. The information processing device constantly performs wireless reception of information regarding the absolute position of the aerial vehicle 30 and/or the moving body 40 from the aerial vehicle 30 and/or the moving body 40. The information processing device may obtain the relative speed of the aerial vehicle 30 with respect to the moving body 40 based on the information regarding the absolute positions of the aerial vehicle 30 and the moving body 40.

In a case where the moving body 40 and the aerial vehicle 30 are in a short distance, there is a possibility that the moving body 40 or a building exists near the aerial vehicle 30, leading to occurrence of a situation in which the GNSS sensor of the aerial vehicle 30 become unstable. With the accuracy of the GNSS, there is a risk of collision of the aerial vehicle 30 with the moving body 40 when the aerial vehicle 30 lands on the moving body 40. To handle these, when the distance between the aerial vehicle 30 and the moving body 40 becomes shorter than the distance TH, the information processing device estimates the relative position and the relative attitude of the aerial vehicle 30 with respect to the moving body 40 using vision information with high accuracy. The information processing device controls landing of the aerial vehicle 30 on the moving body 40 based on information regarding the estimated relative position and relative attitude.

This makes it possible for the information processing device to control the aerial vehicle 30 with higher accuracy.

5-2. Modification of Automatic Return Control

In the above-described embodiment (<3-5. Automatic return control>), as illustrated in FIG. 19A, the information processing device controls the aerial vehicle 30 to move to the target point TP by gradually lowering the aerial vehicle 30 until the altitude of the aerial vehicle 30 reaches the altitude h1 of the target point TP while maintaining the directional vector of the aerial vehicle 30 at the directional vector D2. However, the method of moving the aerial vehicle 30 to the target point TP is not limited to this method. For example, the information processing device can control to move the aerial vehicle 30 to the target point TP by the following method.

Figure 24:
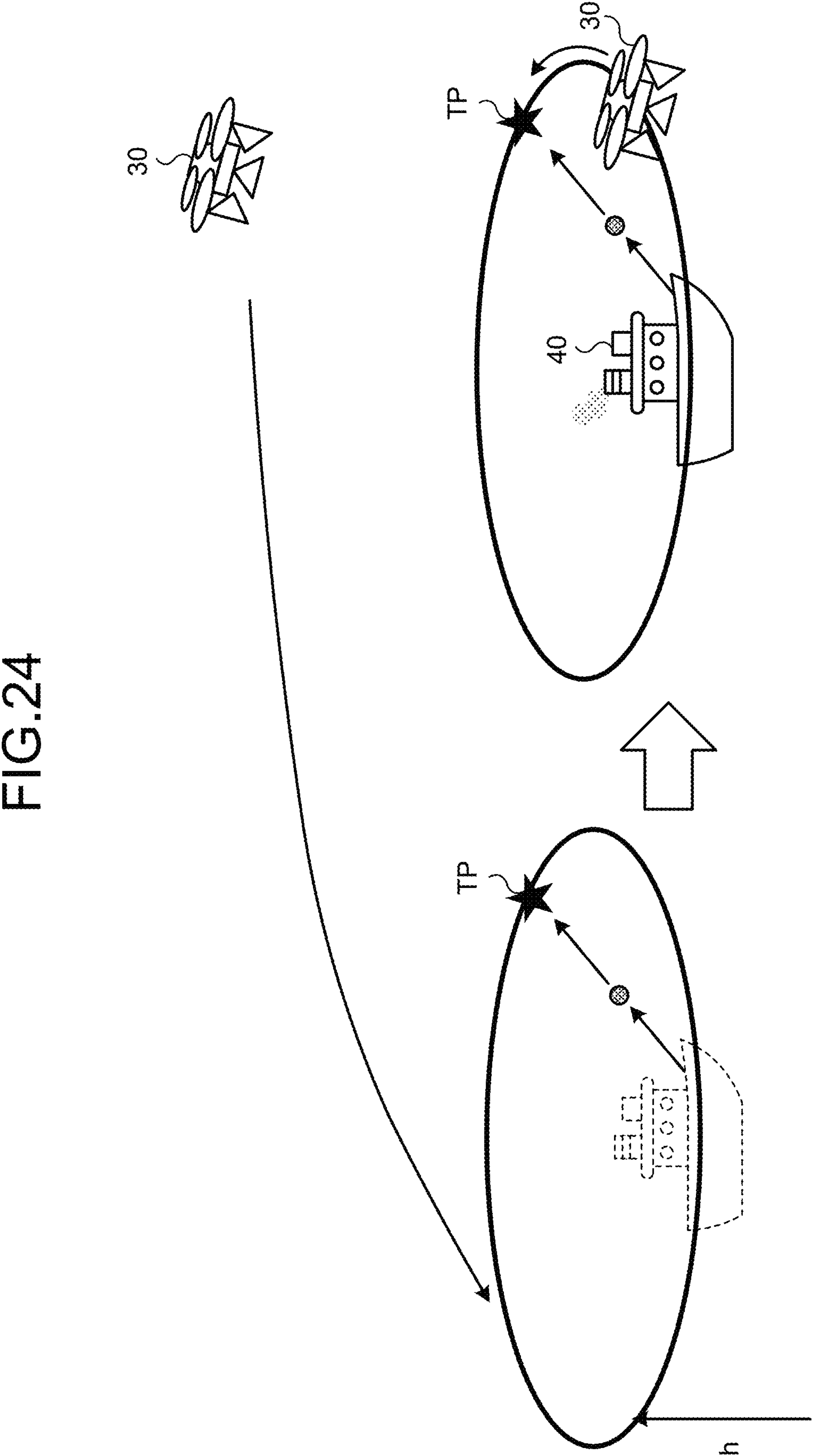
FIG. 24 is a diagram illustrating a modification of the automatic return control.

FIG. 24 is a diagram illustrating a modification of the automatic return control. First, the information processing device controls the aerial vehicle 30 to move toward a circulating orbit at a predetermined altitude and a predetermined distance around the moving body 40. This circulating orbit is an orbit passing through the target point TP as illustrated in FIG. 24. The information processing device causes the aerial vehicle 30 to circle above the moving body 40 while maintaining a predetermined distance and a predetermined altitude from the moving body 40. This makes it possible for the information processing device to move the aerial vehicle 30 to the target point TP.

Whether the aerial vehicle 30 can reach the target point TP at the time of return is important in determining whether the path at the time of departure can be reversely traced. By allowing the aerial vehicle 30 to circulate over the moving body 40, the aerial vehicle 30 can reliably reach the target point TP, making it possible to allow the aerial vehicle 30 to reliably return to the moving body 40.

5-3. Other Modifications

The control device that controls the server 10, the terminal device 20, the aerial vehicle 30, or the moving body 40 of the present embodiment may be actualized by a dedicated computer system or a general-purpose computer system.

For example, a communication program for executing the above-described operations is stored in a computer-readable recording medium such as an optical disk, semiconductor memory, a magnetic tape, or a flexible disk and distributed. For example, the program is installed on a computer and the above processing is executed to achieve the configuration of the control device. At this time, the control device may be a device (for example, a personal computer) outside the server 10, the terminal device 20, the aerial vehicle 30, and the moving body 40. Furthermore, the control device may be a device (for example, the control unit 13, the control unit 23, the control unit 33, or the control unit 43) inside the server 10, the terminal device 20, the aerial vehicle 30 or the moving body 40.

Furthermore, the communication program may be stored in a disk device included in a server device on a network such as the Internet so as to be able to be downloaded to a computer, for example. Furthermore, the functions described above may be implemented by using operating system (OS) and application software in cooperation. In this case, the portions other than the OS may be stored in a medium for distribution, or the portions other than the OS may be stored in a server device so as to be downloaded to a computer, for example.

Furthermore, among individual processing described in the above embodiments, all or a part of the processing described as being performed automatically may be manually performed, or the processing described as being performed manually can be performed automatically by known methods. In addition, the processing procedures, specific names, and information including various data and parameters illustrated in the above Literatures or drawings can be arbitrarily altered unless otherwise specified. For example, a variety of information illustrated in each of the drawings are not limited to the information illustrated.

In addition, each of components of each device is provided as a functional and conceptional illustration and thus does not necessarily need to be physically configured as illustrated. That is, the specific form of distribution/integration of each of the devices is not limited to those illustrated in the drawings, and all or a part thereof may be functionally or physically distributed or integrated into arbitrary units according to various loads and use situations. This configuration by distribution and integration may be performed dynamically.

Furthermore, the above-described embodiments can be appropriately combined within a range implementable without contradiction of processing. Furthermore, the order of individual steps illustrated in the flowcharts of the above-described embodiment can be changed as appropriate.

Furthermore, for example, the present embodiment can be implemented as any configuration constituting a device or a system, for example, a processor as a large scale integration (LSI) or the like, a module using a plurality of processors or the like, a unit using a plurality of modules or the like, and a set obtained by further adding other functions to the unit, or the like (that is, a configuration of a part of the device).

In the present embodiment, a system represents a set of a plurality of components (devices, modules (parts), or the like), and whether all the components are in the same housing would not be a big issue. Therefore, a plurality of devices housed in separate housings and connected via a network, and one device in which a plurality of modules are housed in one housing, are both systems.

Furthermore, for example, the present embodiment can adopt a configuration of cloud computing in which one function is cooperatively shared and processed by a plurality of devices via a network.

6. Conclusion

As described above, according to an embodiment of the present disclosure, the information processing device classifies an image captured by an aerial vehicle into a plurality of regions using an image classification technology. Subsequently, the information processing device performs self-position estimation based on the classified images. For example, the information processing device uses the region of the moving body 40 in the image to estimate the relative position and the relative attitude of the aerial vehicle 30 with respect to the moving body 40. At this time, the information processing device does not use a moving region other than the moving body 40 for self-position estimation. This makes it possible to perform self-position estimation with high accuracy even when the home point is moving, leading to reliable flight control of the aerial vehicle 30.

Moreover, the information processing device switches the estimation method according to the distance of the aerial vehicle 30 from the moving body 40. For example, in a case where the distance between the aerial vehicle 30 and the moving body 40 is shorter than a predetermined distance, the information processing device estimates the relative position and the relative attitude with respect to the moving body based on feature points of the region of the moving body 40 in the image. In contrast, when the distance between the aerial vehicle 30 and the moving body 40 is longer than the predetermined distance, the information processing device constantly tracks the moving body by using the moving body detection by the bounding box. This makes it possible for the information processing device to constantly grasp the relative position between the aerial vehicle and the moving body, leading to achievement of reliable control of the flight of the aerial vehicle.

Furthermore, at the time of take-off and landing of the aerial vehicle 30 on the moving body 40, the information processing device controls the flight of the aerial vehicle 30 so as to cancel the movement of the moving body 40 by using the information regarding the relative position and the relative attitude with respect to the moving body 40 estimated from vision information. This makes it possible for the aerial vehicle 30 perform take-off and landing without colliding with the moving body 40.

Furthermore, the information processing device retains a path at the departure of the aerial vehicle 30 from the moving body 40, and controls, at the time of return, the flight of the aerial vehicle 30 to follow the reverse of the retained path. This makes it possible for the aerial vehicle 30 to return to the moving body 40 without colliding with the moving body 40.

The embodiments of the present disclosure have been described above. However, the technical scope of the present disclosure is not limited to the above-described embodiments, and various modifications can be made without departing from the scope of the present disclosure. Moreover, it is allowable to combine the components across different embodiments and modifications as appropriate.

The effects described in individual embodiments of the present specification are merely examples, and thus, there may be other effects, not limited to the exemplified effects.

Note that the present technique can also have the following configurations.

(1)

An information processing method executed by one processor or executed by a plurality of processors in cooperation, the method comprising:

an estimation step of estimating a relative position or a relative attitude of an aerial vehicle with respect to a moving body;

an acquisition step of acquiring information related to a distance between the moving body and the aerial vehicle; and a switching step of switching an estimation method for estimating the relative position or the relative attitude of the aerial vehicle, based on the information related to the distance.

(2)

The information processing method according to (1), wherein the switching step switches the estimation method from a first estimation method to a second estimation method different from the first estimation method when it is estimated that the aerial vehicle is shifted to a state not satisfying a first criterion related to closeness in distance to the moving body.

(3)

The information processing method according to (2), wherein the switching step switches the estimation method from the second estimation method to the first estimation method or to a third estimation method, which is neither the first estimation method nor the second estimation method, when it is estimated that the aerial vehicle is shifted to a state satisfying a second criterion regarding closeness in distance to the moving body.

(4)

The information processing method according to (2) or (3), wherein the acquisition step acquires information from a sensor mounted on the aerial vehicle as the information related to the distance, and the switching step estimates a distance between the moving body and the aerial vehicle based on the information from the sensor, and switches the estimation method from the first estimation method to the second estimation method when the estimated distance is longer than a predetermined distance.

(5)

The information processing method according to (2) or (3), wherein the moving body is a moving body that moves on water or land, the acquisition step acquires altitude information of the aerial vehicle as the information related to the distance, and the switching step switches the estimation method from the first estimation method to the second estimation method when an altitude of the aerial vehicle becomes higher than a predetermined altitude.

(6)

The information processing method according to (2) or (3), wherein the acquisition step acquires information that enables determination of a region of the moving body occupied in an image captured by the aerial vehicle as the information related to the distance, and the switching step switches the estimation method from the first estimation method to the second estimation method when a ratio of the region of the moving body with respect to the image captured by the aerial vehicle becomes lower than a predetermined ratio.

(7)

The information processing method according to (2) or (3), wherein the acquisition step acquires information regarding feature points of the moving body detected from an image captured by the aerial vehicle as the information regarding the distance, and the switching step checks matching between the feature points detected in an image at a past predetermined time point and the feature points detected in an image at a current time point, and switches the estimation method from the first estimation method to the second estimation method when the number of matched feature points is smaller than a predetermined number.

(8)

The information processing method according to any one of (2) to (7), wherein the first estimation method is a method of estimating the relative position or the relative attitude of the aerial vehicle based on a coordinate system relative to the moving body, and the second estimation method is a method of estimating the relative position or the relative attitude of the aerial vehicle based on a stationary coordinate system.

(9)

The information processing method according to (8), further comprising an image classification step of classifying an image captured by the aerial vehicle into a plurality of regions by a predetermined image classification technology, wherein the estimation step includes:

estimating the relative position or the relative attitude of the aerial vehicle based on information of a region of the moving body in the image when estimating the relative position or the relative attitude of the aerial vehicle using the first estimation method, and estimating the relative position or the relative attitude of the aerial vehicle based on information regarding a region of the moving body in the image and information regarding a region other than the region of the moving body in the image when estimating the relative position or the relative attitude of the aerial vehicle using the second estimation method.

(10)

The information processing method according to (9), wherein the image classification step classifies an image captured by the aerial vehicle into a plurality of regions by semantic segmentation or instance segmentation.

(11)

The information processing method according to (9) or (10), wherein the estimation step estimates the relative position or the relative attitude of the aerial vehicle based on information regarding feature points detected from the region of the moving body in the image when estimating the relative position or the relative attitude of the aerial vehicle using the first estimation method.

(12)

The information processing method according to any one of (9) to (11), wherein the estimation step estimates the relative position or the relative attitude of the aerial vehicle based on information regarding the region of the moving body in the image and information regarding a region of a stationary structure when estimating the relative position or the relative attitude of the aerial vehicle using the second estimation method.

(13)

The information processing method according to any one of (9) to (11), wherein the moving body is a ship that moves on water, and the estimation step estimates the relative position or the relative attitude of the aerial vehicle based on information regarding the region of the moving body in the image and information regarding a region which is a region other than the region of the moving body and which is a region excluding a water surface and moving objects other than the moving body when estimating the relative position or the relative attitude of the aerial vehicle using the second estimation method.

(14)

The information processing method according to any one of (9) to (11), wherein the estimation step estimates the relative position or the relative attitude of the aerial vehicle by tracking the moving body in the image using a bounding box when estimating the relative position or the relative attitude of the aerial vehicle using the second estimation method.

(15)

The information processing method according to any one of (2) to (14), wherein the aerial vehicle is configured to use a predetermined position on the moving body as a home point, and the method further comprising:

a path retention step of retaining a flight path from take-off of the aerial vehicle from the home point to a point where the aerial vehicle is shifted to a state not satisfying the first criterion; and a flight control step of controlling a flight of the aerial vehicle so that the aerial vehicle returns to the home point by reversely following the retained flight path when the aerial vehicle returns to the home point.

(16)

The information processing method according to (15), wherein the flight control step controls the flight of the aerial vehicle by finding a relative position at which the aerial vehicle is shifted to a state not satisfying the first criterion by allowing the aerial vehicle to circle in sky over the moving body in a case where the aerial vehicle returns to the home point so as to allow the flight of the aerial vehicle to reversely follow the flight path from the relative position.

(17)

The information processing method according to any one of (1) to (16), wherein the aerial vehicle is a drone.

(18)

An information processing device comprising:

an estimation unit that estimates a relative position or a relative attitude of an aerial vehicle with respect to a moving body;

an acquisition unit that acquires information related to a distance between the moving body and the aerial vehicle; and a switching unit that switches an estimation method for estimating the relative position or the relative attitude of the aerial vehicle, based on the information related to the distance.

(19)

An information processing program for causing one or a plurality of computers to function as functional units comprising:

an estimation unit that estimates a relative position or a relative attitude of an aerial vehicle with respect to a moving body;

an acquisition unit that acquires information related to a distance between the moving body and the aerial vehicle; and a switching unit that switches an estimation method for estimating the relative position or the relative attitude of the aerial vehicle, based on the information related to the distance.

(20)

An information processing system comprising an aerial vehicle and one or a plurality of information processing devices directly or indirectly connected to the aerial vehicle via communication, the information processing system further comprising:

an estimation unit that estimates a relative position or a relative attitude of the aerial vehicle with respect to the moving body;

an acquisition unit that acquires information related to a distance between the moving body and the aerial vehicle; and a switching unit that switches an estimation method for estimating the relative position or the relative attitude of the aerial vehicle, based on the information related to the distance.

| Reference Signs List | |
|---|---|
| 1 | AERIAL VEHICLE CONTROL SYSTEM |
| 10 | SERVER |
| 20 | TERMINAL DEVICE |
| 30 | AERIAL VEHICLE |
| 40 | MOVING BODY |
| 11, 21, 31, 41, 601 | COMMUNICATION UNIT |
| 12, 22, 32, 42, 512 | STORAGE UNIT |
| 13, 23, 33, 43 | CONTROL UNIT |
| 24, 34, 44 | SENSOR UNIT |
| 25 | OPERATION UNIT |
| 35 | IMAGING UNIT |
| 36, 45 | POWER UNIT |
| 131, 231, 331, 431 | ACQUISITION UNIT |
| 132, 232, 332, 432 | IMAGE CLASSIFICATION UNIT |
| 133, 233, 333, 433 | ESTIMATION UNIT |
| 134, 234, 334, 434 | SWITCHING UNIT |
| 135, 235, 335, 435 | PATH RETENTION UNIT |
| 136, 236, 336, 436, 514 | FLIGHT CONTROL UNIT |
| 501 | MOVING BODY DETECTION UNIT |
| 502 | IMAGE CLASSIFICATION UNIT |
| 503 | FEATURE POINT DETECTION UNIT |
| 504 | VISION RELATIVE POSITION ESTIMATION UNIT |
| 505 | VISION ABSOLUTE POSITION ESTIMATION UNIT |
| 506 | IMU |
| 507 | GNSS SENSOR |
| 508 | BAROMETER |
| 509 | GEOMAGNETIC SENSOR |
| 510 | ABSOLUTE POSITION ESTIMATION UNIT |
| 511 | KEY FRAME REGISTRATION UNIT |

-continued

| Reference Signs List | |
|---|---|
| 513 | MATCHING CHECK UNIT |
| 602 | RELATIVE POSITION ESTIMATION UNIT |
| N | NETWORK |

The invention claimed is:

1. An information processing method executed by one processor or executed by a plurality of processors in cooperation, the method comprising:
estimating a relative position of an aerial vehicle with respect to a moving body or a relative attitude of the aerial vehicle with respect to the moving body;
acquiring information related to a distance between the moving body and the aerial vehicle;
switching a process by which the relative position of the aerial vehicle with respect to the moving body or the relative attitude of the aerial vehicle with respect to the moving body is estimated based on the information related to the distance; and
controlling a flight of the aerial vehicle based on the relative position or the relative attitude estimated by the switched process.

2. The information processing method according to claim 1, wherein the switching switches the process from a first process to a second process different from the first process when it is estimated that the aerial vehicle is shifted to a state not satisfying a first criterion related to closeness in distance to the moving body.

3. The information processing method according to claim 2, wherein the switching switches the process from the second process to the first process or to a third process, which is neither the first process nor the second process, when it is estimated that the aerial vehicle is shifted to a state satisfying a second criterion regarding closeness in distance to the moving body.

4. The information processing method according to claim 2, wherein
the acquiring acquires information from a sensor mounted on the aerial vehicle as the information related to the distance, and
the switching estimates a distance between the moving body and the aerial vehicle based on the information from the sensor, and switches the process from the first process to the second process when the estimated distance is longer than a predetermined distance.

5. The information processing method according to claim 2, wherein
the moving body is a moving body that moves on water or land,
the acquiring acquires altitude information of the aerial vehicle as the information related to the distance, and
the switching switches the process from the first process to the second process when an altitude of the aerial vehicle becomes higher than a predetermined altitude.

6. The information processing method according to claim 2, wherein
the acquiring acquires information that enables determination of a region of the moving body occupied in an image captured by the aerial vehicle as the information related to the distance, and
the switching switches the process from the first process to the second process when a ratio of the region of the moving body with respect to the image captured by the aerial vehicle becomes lower than a predetermined ratio.

7. The information processing method according to claim 2, wherein
the acquiring acquires information regarding feature points of the moving body detected from an image captured by the aerial vehicle as the information regarding the distance, and
the switching checks matching between the feature points detected in an image at a past predetermined time point and the feature points detected in an image at a current time point, and switches the process from the first process to the second process when the number of matched feature points is smaller than a predetermined number.

8. The information processing method according to claim 2, wherein
the first process is a method of estimating the relative position or the relative attitude of the aerial vehicle based on a coordinate system relative to the moving body, and
the second process is a method of estimating the relative position or the relative attitude of the aerial vehicle based on a stationary coordinate system.

9. The information processing method according to claim 8, further comprising classifying an image captured by the aerial vehicle into a plurality of regions by a predetermined image classification technology,
wherein the estimating includes:
estimating the relative position or the relative attitude of the aerial vehicle based on information of a region of the moving body in the image when estimating the relative position or the relative attitude of the aerial vehicle using the first process, and
estimating the relative position or the relative attitude of the aerial vehicle based on information regarding a region of the moving body in the image and information regarding a region other than the region of the moving body in the image when estimating the relative position or the relative attitude of the aerial vehicle using the second process.

10. The information processing method according to claim 9, wherein the classifying classifies the image captured by the aerial vehicle into a plurality of regions by semantic segmentation or instance segmentation.

11. The information processing method according to claim 9, wherein the estimating estimates the relative position or the relative attitude of the aerial vehicle based on information regarding feature points detected from the region of the moving body in the image when estimating the relative position or the relative attitude of the aerial vehicle using the first process.

12. The information processing method according to claim 9, wherein the estimating estimates the relative position or the relative attitude of the aerial vehicle based on information regarding the region of the moving body in the image and information regarding a region of a stationary structure when estimating the relative position or the relative attitude of the aerial vehicle using the second process.

13. The information processing method according to claim 9, wherein
the moving body is a ship that moves on water, and
the estimating estimates the relative position or the relative attitude of the aerial vehicle based on information regarding the region of the moving body in the image and information regarding a region which is a region other than the region of the moving body and which is a region excluding a water surface and moving objects other than the moving body when estimating the relative position or the relative attitude of the aerial vehicle using the second process.

14. The information processing method according to claim 9, wherein the estimating estimates the relative position or the relative attitude of the aerial vehicle by tracking the moving body in the image using a bounding box when estimating the relative position or the relative attitude of the aerial vehicle using the second process.

15. The information processing method according to claim 2, wherein the aerial vehicle is configured to use a predetermined position on the moving body as a home point, and the method further comprises;

retaining a flight path from take-off of the aerial vehicle from the home point to a point where the aerial vehicle is shifted to a state not satisfying the first criterion; and controlling the flight of the aerial vehicle so that the aerial vehicle returns to the home point by reversely following the retained flight path when the aerial vehicle returns to the home point.

16. The information processing method according to claim 15, wherein the controlling controls the flight of the aerial vehicle by finding a relative position at which the aerial vehicle is shifted to a state not satisfying the first criterion by allowing the aerial vehicle to circle in sky over the moving body in a case where the aerial vehicle returns to the home point so as to allow the flight of the aerial vehicle to reversely follow the flight path from the relative position.

17. The information processing method according to claim 1, wherein the aerial vehicle is a drone.

18. An information processing device comprising:

processing circuitry configured to estimate a relative position of an aerial vehicle with respect to a moving body or a relative attitude of the aerial vehicle with respect to the moving body:

acquire information related to a distance between the moving body and the aerial vehicle;

switch a process by which the relative position of the aerial vehicle with respect to the moving body or the relative attitude of the aerial vehicle with respect to the moving body is estimated based on the information related to the distance; and control a flight of the aerial vehicle based on the relative position or the relative attitude estimated by the switched process.

19. A non-transitory computer readable medium storing an information processing program for causing one or a plurality of computers to perform a method, the method comprising:

estimating a relative position of an aerial vehicle with respect to a moving body or a relative attitude of the aerial vehicle with respect to the moving body;

acquiring information related to a distance between the moving body and the aerial vehicle;

switching a process by which the relative position of the aerial vehicle with respect to the moving body or the relative attitude of the aerial vehicle with respect to the moving body is estimated based on the information related to the distance; and controlling a flight of the aerial vehicle based on the relative position or the relative attitude estimated by the switched process.

20. An information processing system comprising:

an aerial vehicle;

one or a plurality of information processing devices directly or indirectly connected to the aerial vehicle via communication; and processing circuitry configured to estimate a relative position of the aerial vehicle with respect to a moving body or a relative attitude of the aerial vehicle with respect to the moving body;

acquire information related to a distance between the moving body and the aerial vehicle;

switch a process by which the relative position of the aerial vehicle with respect to the moving body or the relative attitude of the aerial vehicle with respect to the moving body is estimated based on the information related to the distance; and control a flight of the aerial vehicle based on the relative position or the relative attitude estimated by the switched process.

* * * * *